US011882607B2

(12) United States Patent
Sumiuchi et al.

(10) Patent No.: US 11,882,607 B2
(45) Date of Patent: Jan. 23, 2024

(54) INFORMATION PROCESSING APPARATUS, CONTROL METHOD FOR INFORMATION PROCESSING APPARATUS, AND CONTROL METHOD FOR COMMUNICATION SYSTEM

(71) Applicant: CANON KABUSHIKI KAISHA, Tokyo (JP)

(72) Inventors: Kazuyoshi Sumiuchi, Kawasaki (JP); Yuuki Wakabayashi, Yokohama (JP); Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/531,532

(22) Filed: Nov. 19, 2021

(65) Prior Publication Data

US 2022/0086925 A1 Mar. 17, 2022

Related U.S. Application Data

(63) Continuation of application No. 16/908,079, filed on Jun. 22, 2020, now Pat. No. 11,229,068, which is a
(Continued)

(30) Foreign Application Priority Data

Jan. 29, 2016 (JP) .................... 2016-016485
Mar. 31, 2016 (JP) .................... 2016-072785

(51) Int. Cl.
*H04W 76/10* (2018.01)
*H04W 48/16* (2009.01)
(Continued)

(52) U.S. Cl.
CPC ............ *H04W 76/10* (2018.02); *H04W 4/20* (2013.01); *H04W 4/80* (2018.02); *H04W 48/16* (2013.01);
(Continued)

(58) Field of Classification Search
CPC ....... H04W 76/10; H04W 76/34; H04W 4/80; H04W 4/20; H04W 48/16; H04W 8/005; H04W 84/12; H04W 88/06; H04W 88/08
See application file for complete search history.

(56) References Cited

U.S. PATENT DOCUMENTS 8,320,347 B2 * 11/2012 Shiraki ............... H04W 12/069
370/328
8,351,607 B2 * 1/2013 Ando .................... H04L 63/105
713/168
(Continued)

FOREIGN PATENT DOCUMENTS

CN 102681798 A 9/2012
CN 103312383 A 9/2013
(Continued)

*Primary Examiner* — Hai V Nguyen
(74) *Attorney, Agent, or Firm* — Canon U.S.A., Inc. IP Division

(57) ABSTRACT

A control method for an information processing apparatus includes transmitting, by a first communication unit, information about an access point to which a second communication unit is connected, to a communication apparatus to which the first communication unit is connected. In a case where the information about the access point to which the second communication unit is connected is received, the communication apparatus connects to and communicates with the access point to which the second communication unit is connected by the second wireless communication method.

20 Claims, 29 Drawing Sheets

Related U.S. Application Data continuation of application No. 16/286,198, filed on Feb. 26, 2019, now Pat. No. 10,701,742, which is a continuation of application No. 15/864,988, filed on Jan. 8, 2018, now Pat. No. 10,244,563, which is a continuation of application No. 15/395,551, filed on Dec. 30, 2016, now Pat. No. 9,999,077.

(51) Int. Cl.

| | | |
|---|---|---|
| *H04W 4/80* | (2018.01) | |
| *H04W 76/34* | (2018.01) | |
| *H04W 4/20* | (2018.01) | |
| *H04W 8/00* | (2009.01) | |
| *H04W 84/12* | (2009.01) | |
| *H04W 88/06* | (2009.01) | |
| *H04W 88/08* | (2009.01) | |

(52) U.S. Cl.
CPC ............ *H04W 76/34* (2018.02); *H04W 8/005* (2013.01); *H04W 84/12* (2013.01); *H04W 88/06* (2013.01); *H04W 88/08* (2013.01)

(56) References Cited

U.S. PATENT DOCUMENTS

| | | | | |
|---|---|---|---|---|
| 8,737,404 | B2 * | 5/2014 | Kimura | H04W 76/10 370/395.2 |
| 8,786,879 | B2 * | 7/2014 | Wakabayashi | G06F 3/1204 358/1.14 |
| 9,041,965 | B2 * | 5/2015 | Asai | H04W 48/18 358/1.15 |
| 9,287,977 | B2 * | 3/2016 | Oshima | H04B 10/116 |
| 9,292,233 | B2 * | 3/2016 | Kurihara | H04N 1/00342 |
| 9,311,030 | B2 * | 4/2016 | Asai | H04W 40/24 |
| 9,317,233 | B2 * | 4/2016 | Asai | G06F 3/1236 |
| 9,629,077 | B2 * | 4/2017 | Sumiuchi | H04W 48/20 |
| 9,648,180 | B2 * | 5/2017 | Sasase | H04N 1/00307 |
| 9,742,494 | B2 * | 8/2017 | Oshima | H04B 10/116 |
| 9,832,722 | B2 * | 11/2017 | Sumiuchi | H04W 48/20 |
| 9,996,307 | B2 * | 6/2018 | Kurihara | H04N 1/00214 |
| 9,999,077 | B2 * | 6/2018 | Sumiuchi | H04W 76/10 |
| 10,136,004 | B2 * | 11/2018 | Kurihara | H04N 1/00214 |
| 10,225,015 | B2 * | 3/2019 | Oshima | H04B 10/116 |
| 10,244,563 | B2 * | 3/2019 | Sumiuchi | H04W 4/20 |
| 10,257,704 | B2 * | 4/2019 | Takahashi | G06F 21/44 |
| 10,264,522 | B2 * | 4/2019 | Sumiuchi | H04W 48/20 |
| 10,264,523 | B2 * | 4/2019 | Sumiuchi | H04W 48/16 |
| 10,306,453 | B2 * | 5/2019 | Moriya | H04W 8/005 |
| 10,489,173 | B2 * | 11/2019 | Sumiuchi | H04N 1/32797 |
| 10,609,638 | B2 * | 3/2020 | Kurihara | H04W 48/20 |
| 10,623,592 | B2 * | 4/2020 | Kurihara | G06F 3/1231 |
| 10,701,742 | B2 * | 6/2020 | Sumiuchi | H04W 4/80 |
| 11,019,229 | B2 * | 5/2021 | Kurihara | H04N 1/00342 |
| 11,140,728 | B2 * | 10/2021 | Uchida | H04W 4/80 |
| 11,229,068 | B2 * | 1/2022 | Sumiuchi | H04W 76/34 |
| 11,483,438 | B2 * | 10/2022 | Kurihara | H04N 1/00307 |
| 2010/0067406 | A1 * | 3/2010 | Suzuki | H04W 48/16 370/254 |
| 2010/0082978 | A1 * | 4/2010 | Suzuki | H04L 63/083 713/168 |
| 2010/0082999 | A1 * | 4/2010 | Ando | H04W 12/02 380/270 |
| 2010/0142502 | A1 * | 6/2010 | Shiraki | H04L 67/75 370/338 |
| 2011/0222114 | A1 * | 9/2011 | Wakabayashi | G06F 3/1204 358/1.15 |
| 2013/0163031 | A1 * | 6/2013 | Tanaka | G06F 21/608 358/1.14 |
| 2013/0231047 | A1 * | 9/2013 | Ogawa | H04B 5/0031 711/161 |
| 2013/0272223 | A1 * | 10/2013 | Mathews | H04W 4/70 370/329 |
| 2014/0176980 | A1 * | 6/2014 | Asai | H04N 1/00307 358/1.13 |
| 2014/0181916 | A1 * | 6/2014 | Koo | H04W 8/22 726/4 |
| 2014/0293333 | A1 * | 10/2014 | Asai | H04W 4/80 358/1.15 |
| 2014/0362841 | A1 * | 12/2014 | Shibata | H04W 48/18 370/338 |
| 2015/0188629 | A1 * | 7/2015 | Oshima | H04B 10/116 398/118 |
| 2015/0293735 | A1 * | 10/2015 | Kawai | G06F 3/1236 358/1.15 |
| 2015/0324156 | A1 * | 11/2015 | Asai | G06F 3/1236 358/1.15 |
| 2016/0019007 | A1 * | 1/2016 | Kurihara | H04N 1/00342 358/1.15 |
| 2016/0142140 | A1 * | 5/2016 | Oshima | H04B 10/116 398/130 |
| 2016/0198403 | A1 * | 7/2016 | Sumiuchi | H04W 48/20 455/434 |
| 2016/0227474 | A1 * | 8/2016 | McRae | H04W 48/20 |
| 2017/0131957 | A1 * | 5/2017 | Kurihara | H04N 1/00307 |
| 2017/0181078 | A1 * | 6/2017 | Sumiuchi | H04W 48/20 |
| 2017/0223748 | A1 * | 8/2017 | Sumiuchi | H04W 4/20 |
| 2017/0317749 | A1 * | 11/2017 | Oshima | H04B 10/116 |
| 2018/0049117 | A1 * | 2/2018 | Sumiuchi | H04W 48/16 |
| 2018/0132305 | A1 * | 5/2018 | Sumiuchi | H04W 48/16 |
| 2018/0227845 | A1 * | 8/2018 | Sumiuchi | H04W 8/005 |
| 2018/0260180 | A1 * | 9/2018 | Kurihara | G06F 3/1204 |
| 2019/0200399 | A1 * | 6/2019 | Sumiuchi | H04W 4/20 |
| 2020/0322999 | A1 * | 10/2020 | Sumiuchi | H04W 76/34 |

FOREIGN PATENT DOCUMENTS

| | | |
|---|---|---|
| CN | 105278892 A | 1/2016 |
| JP | 2006037373 A | 3/2006 |
| JP | 2014230152 A | 12/2014 |

* cited by examiner

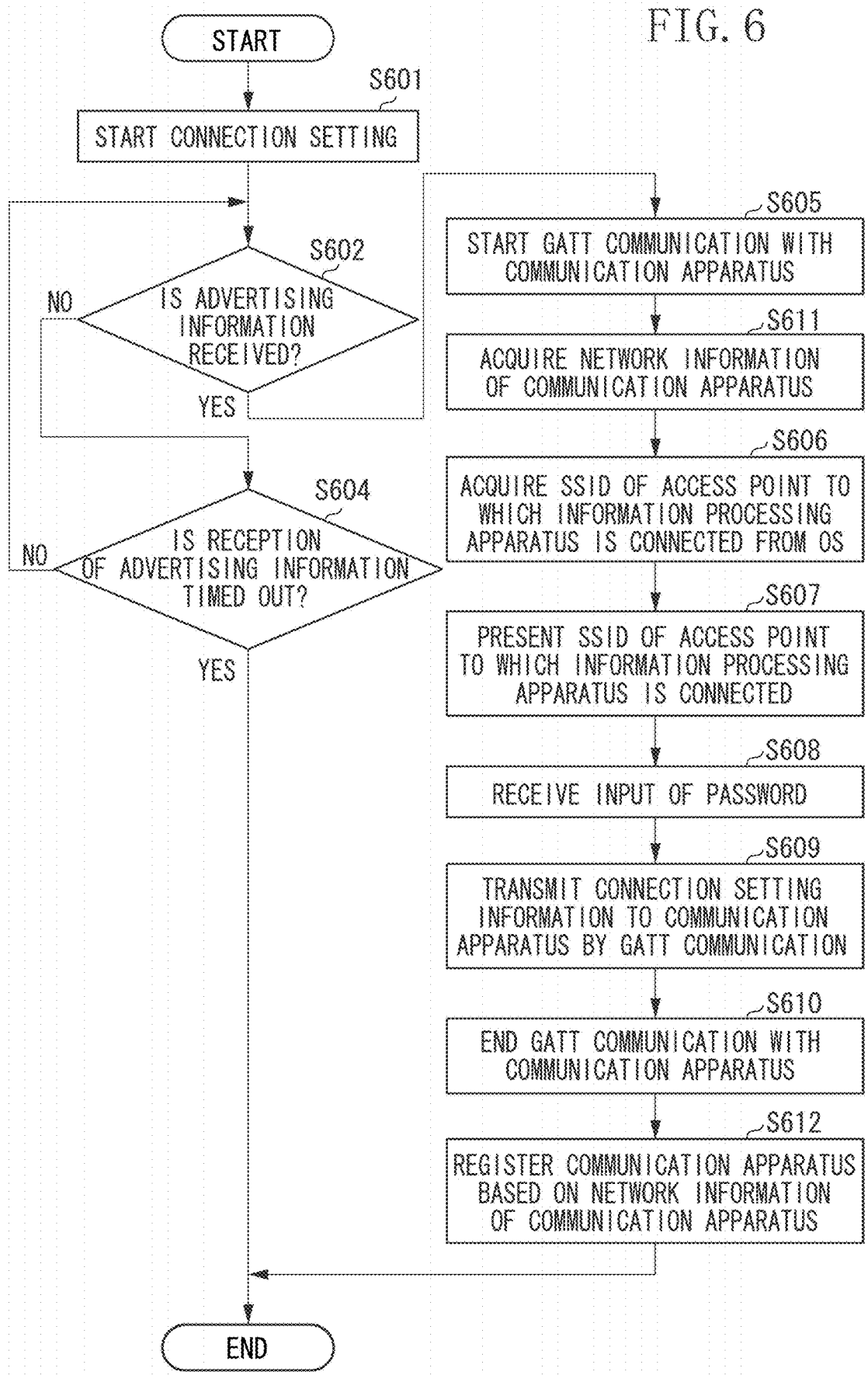

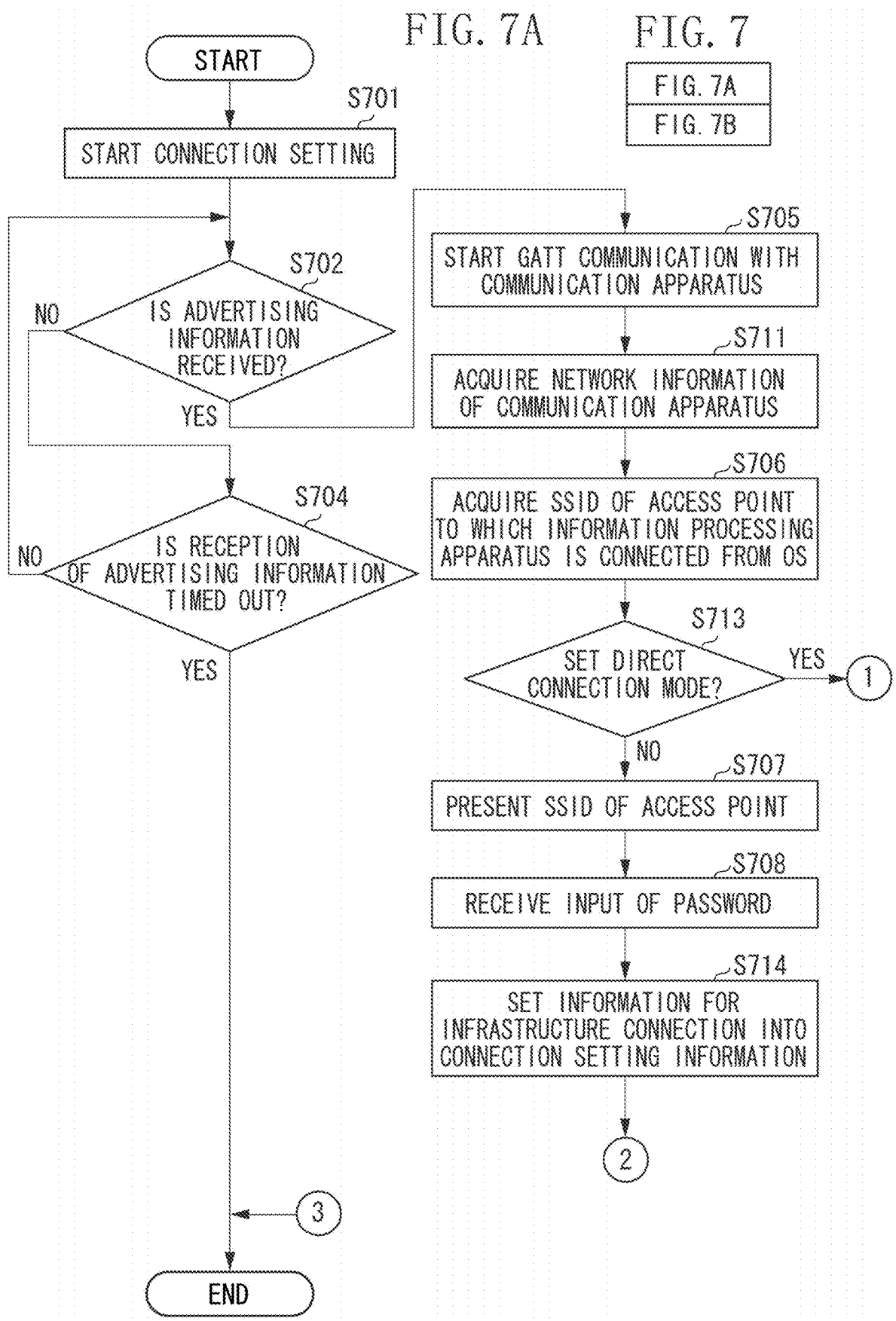

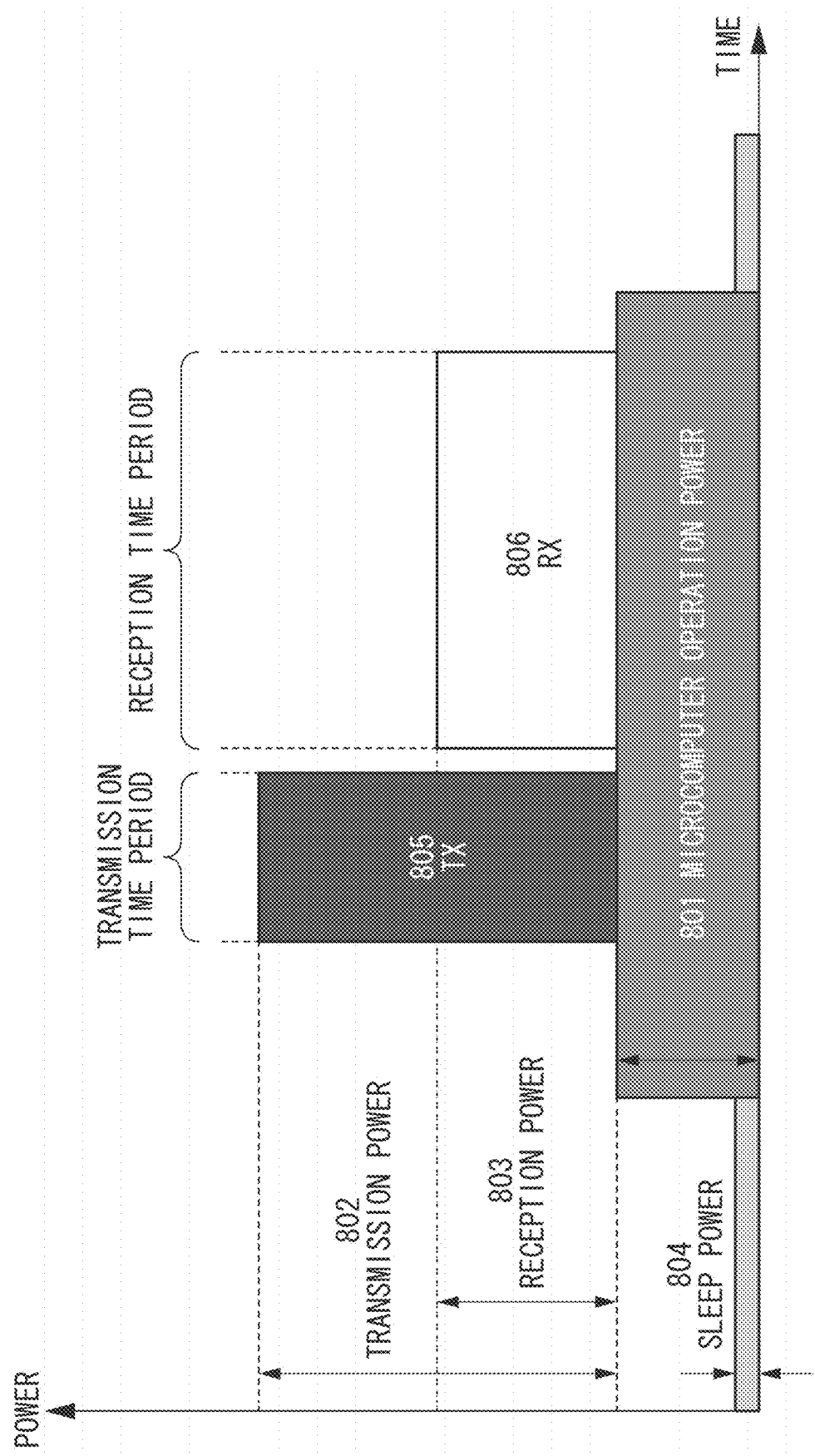

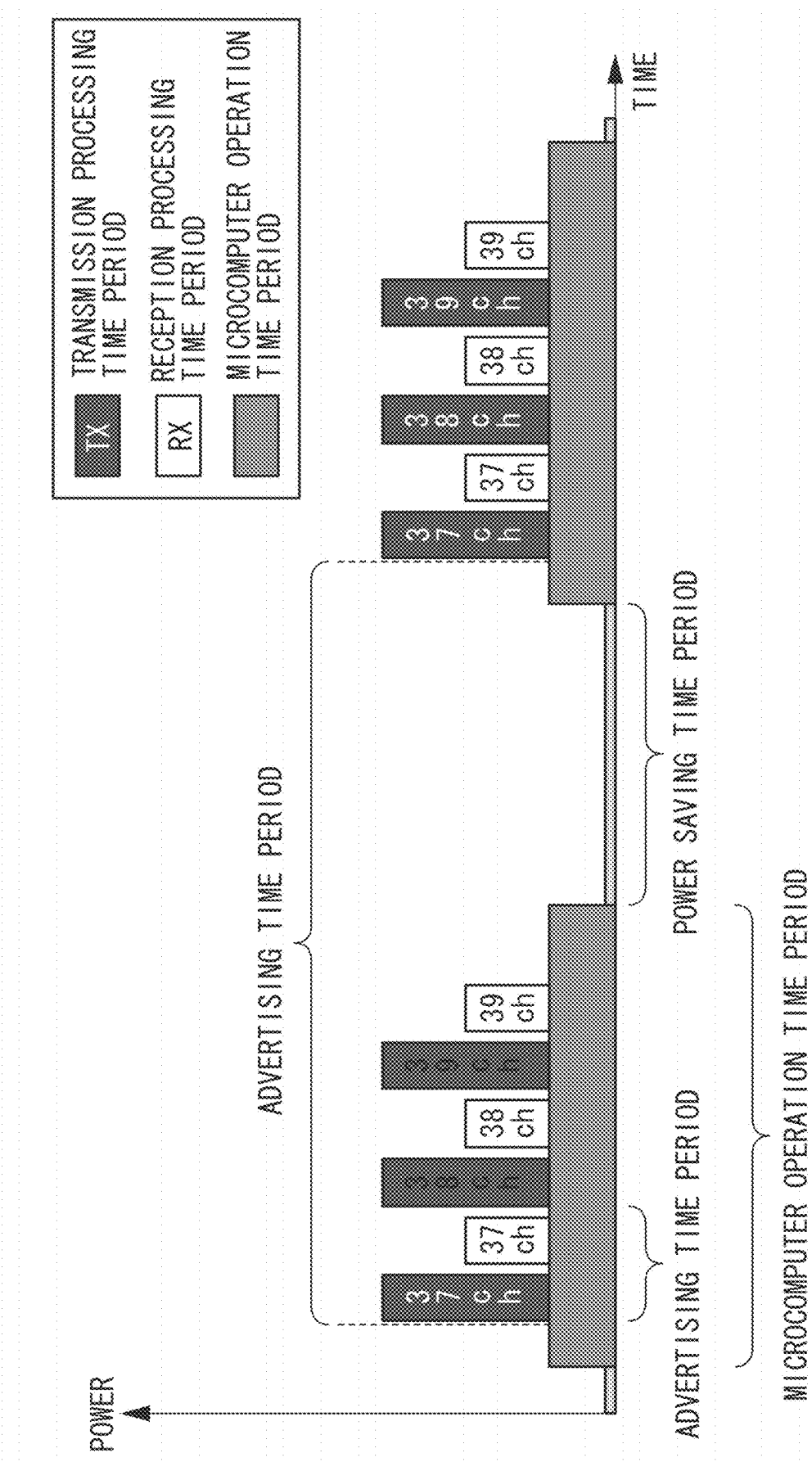

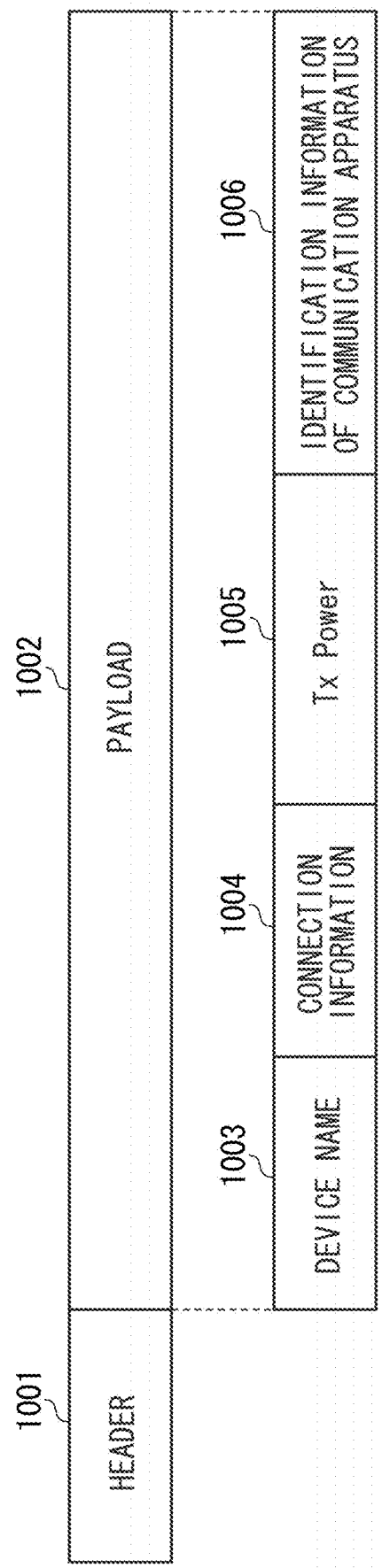

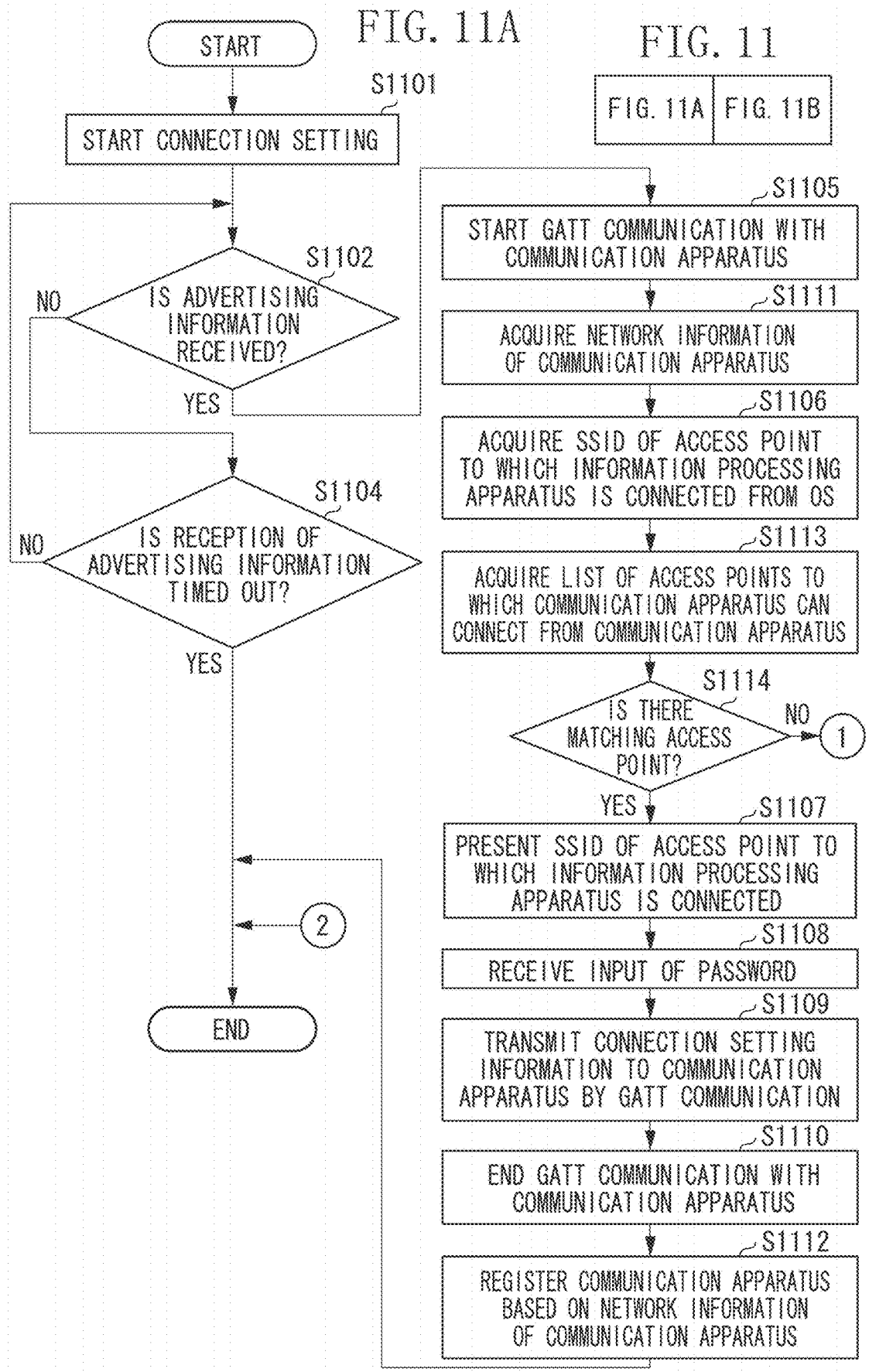

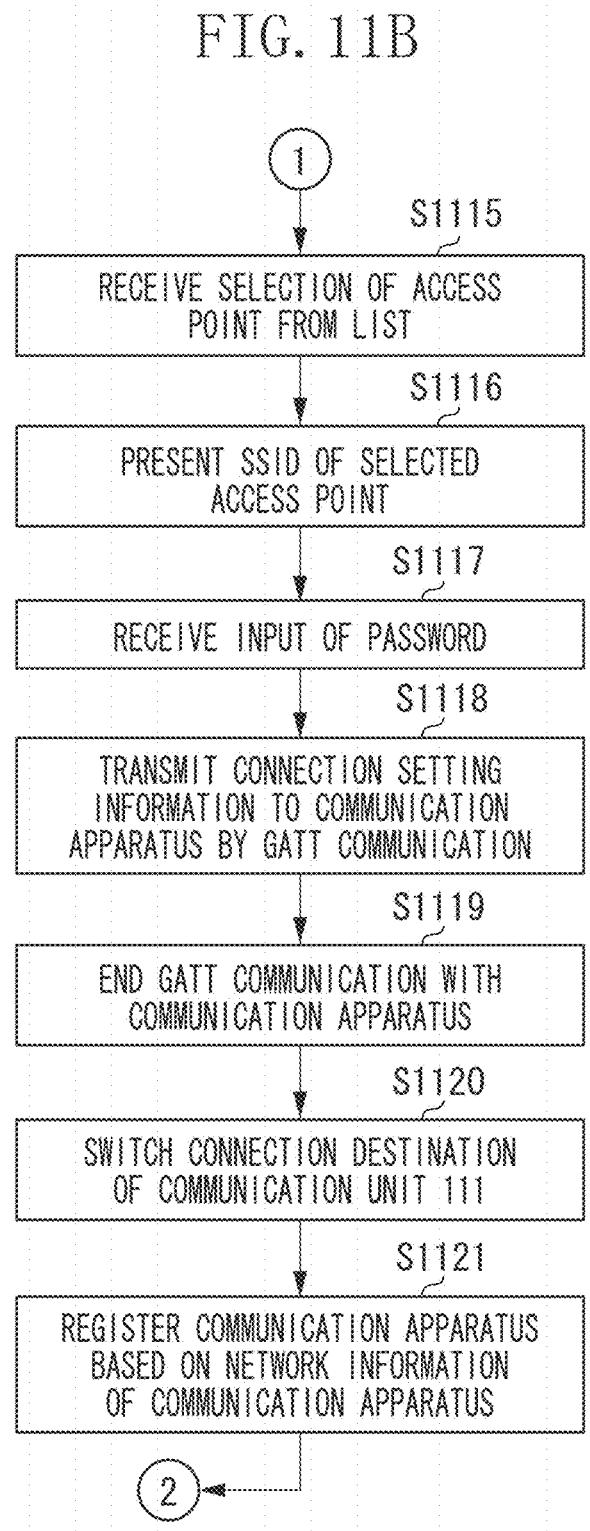

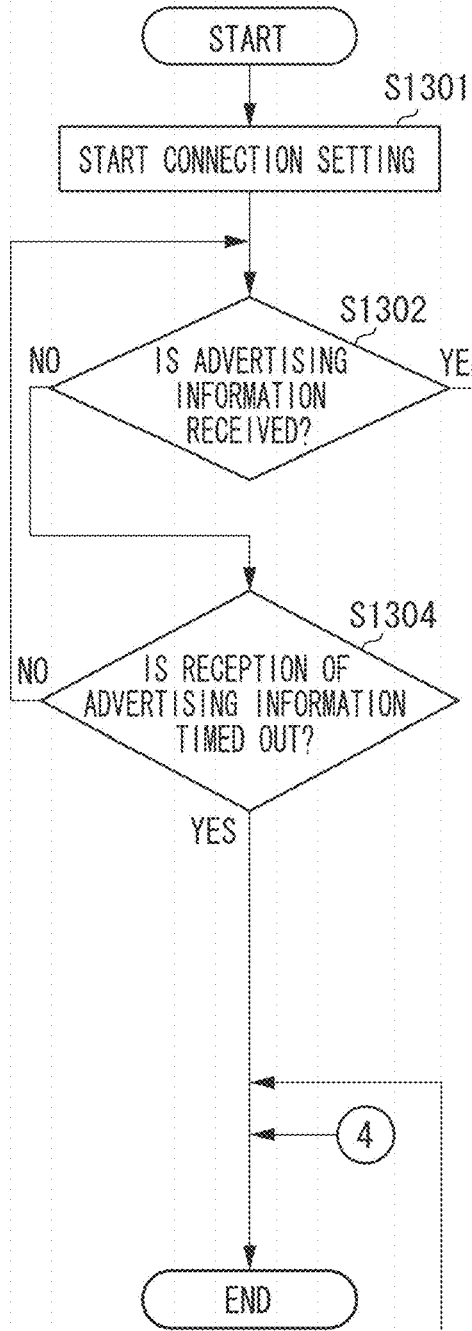
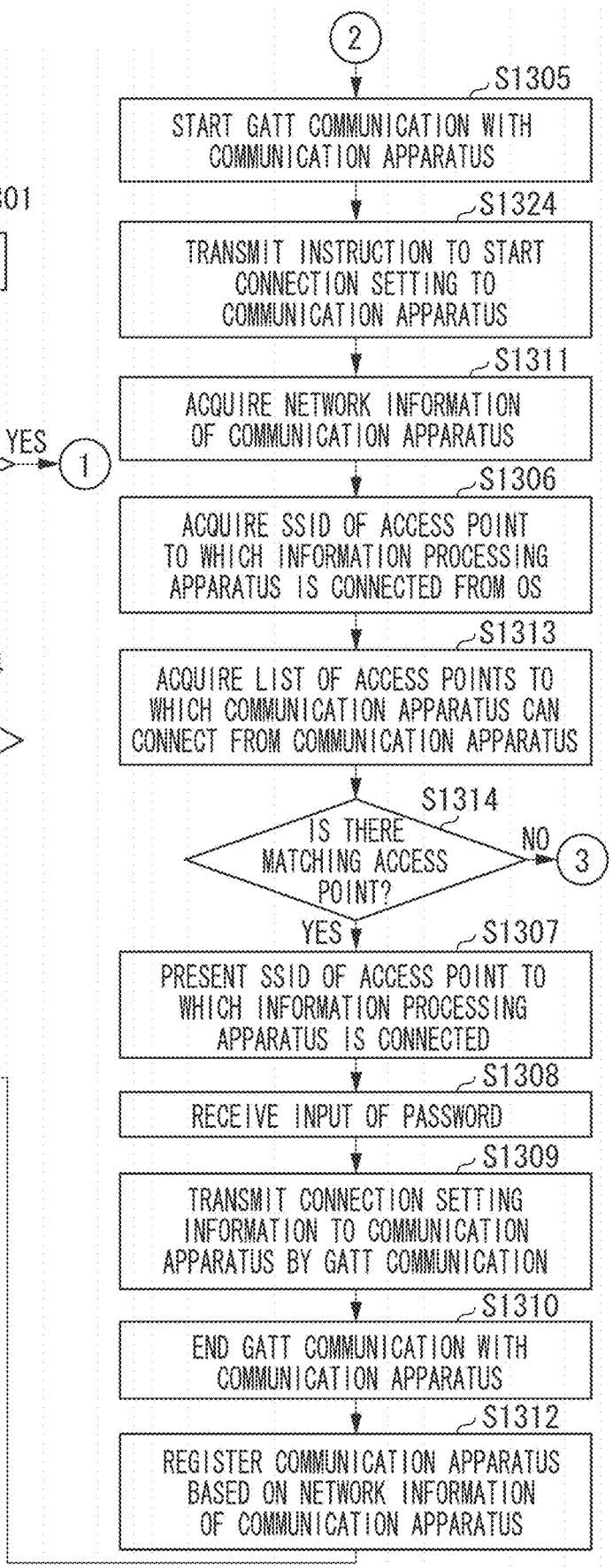
FIG. 13

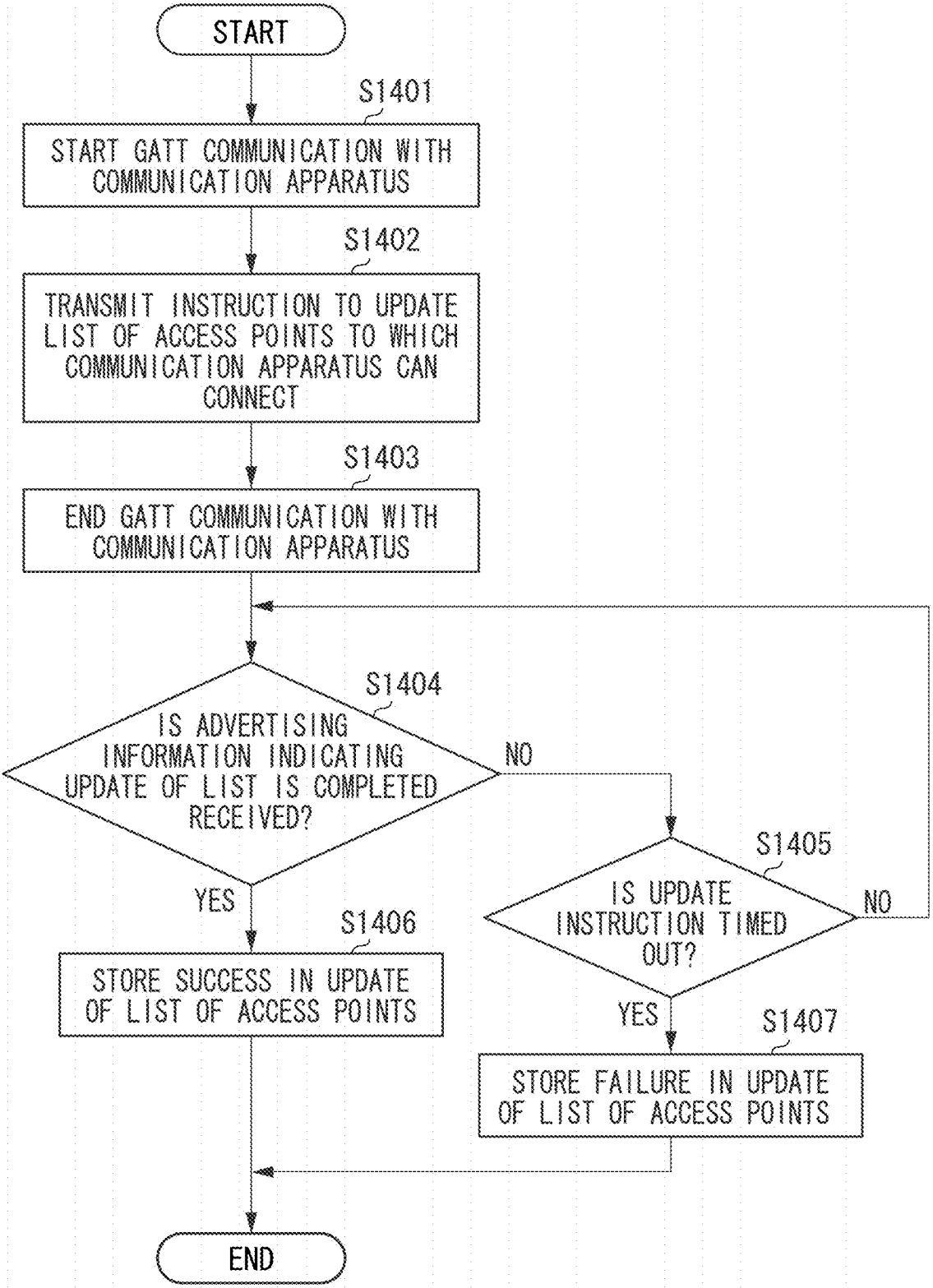

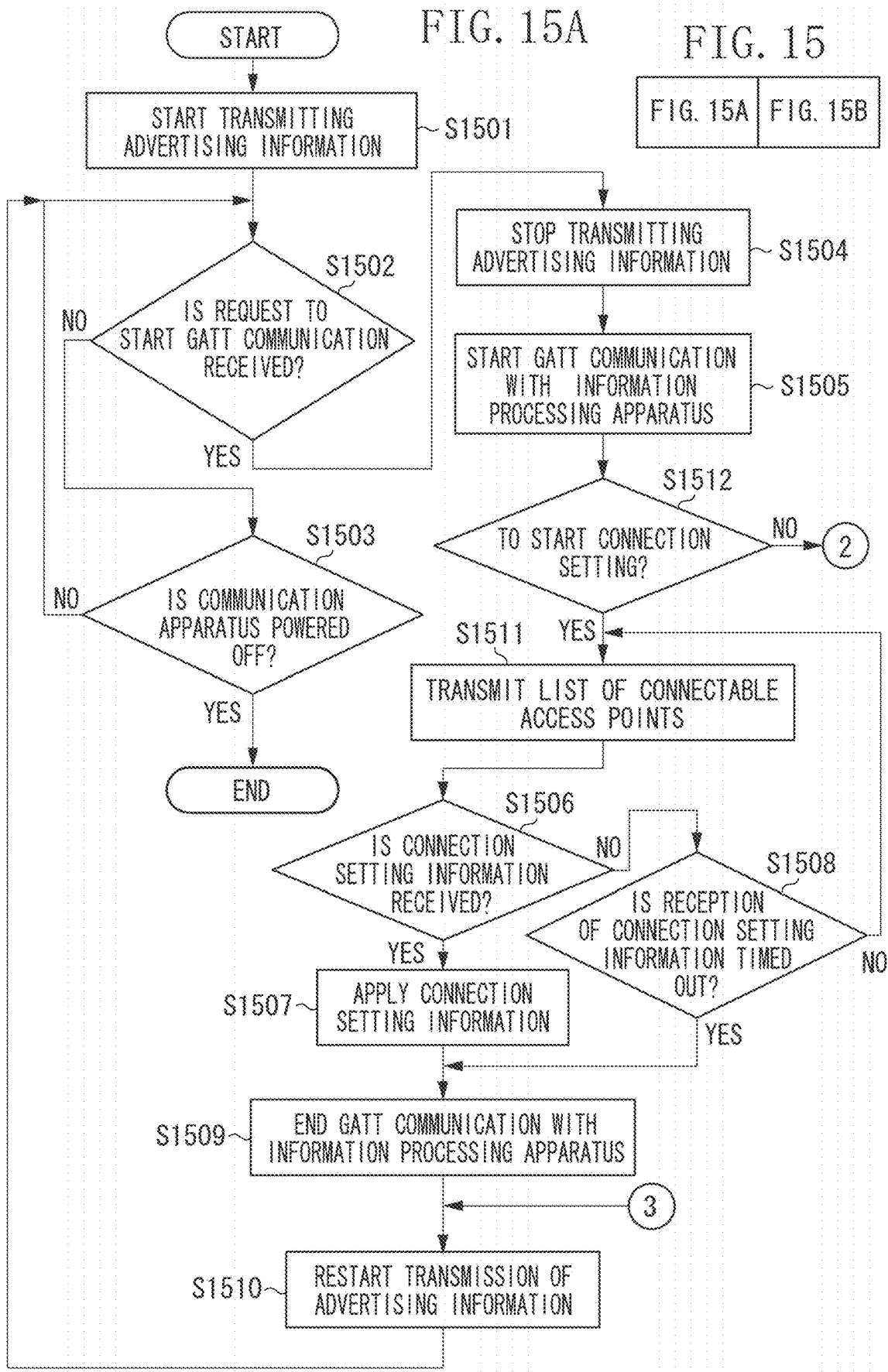

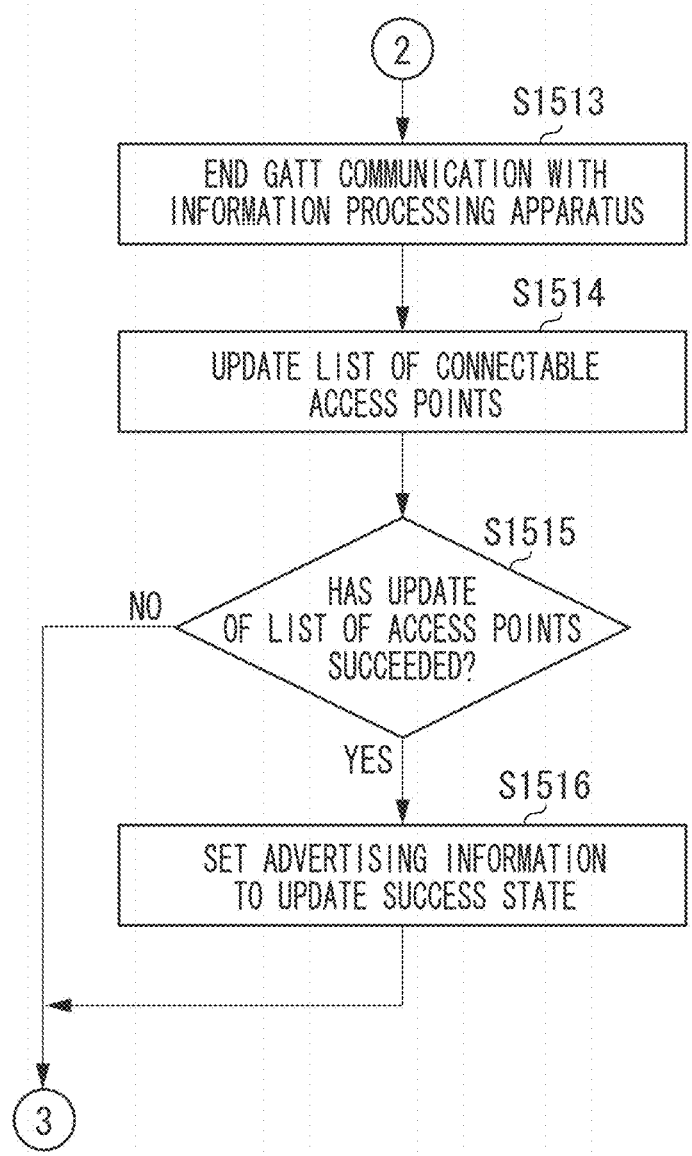

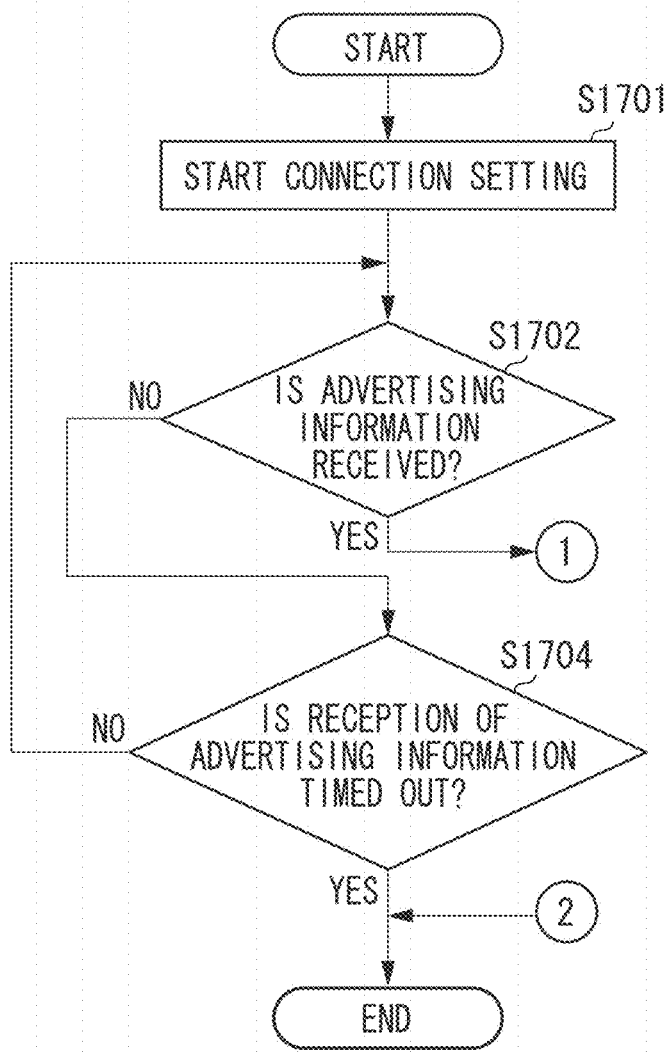

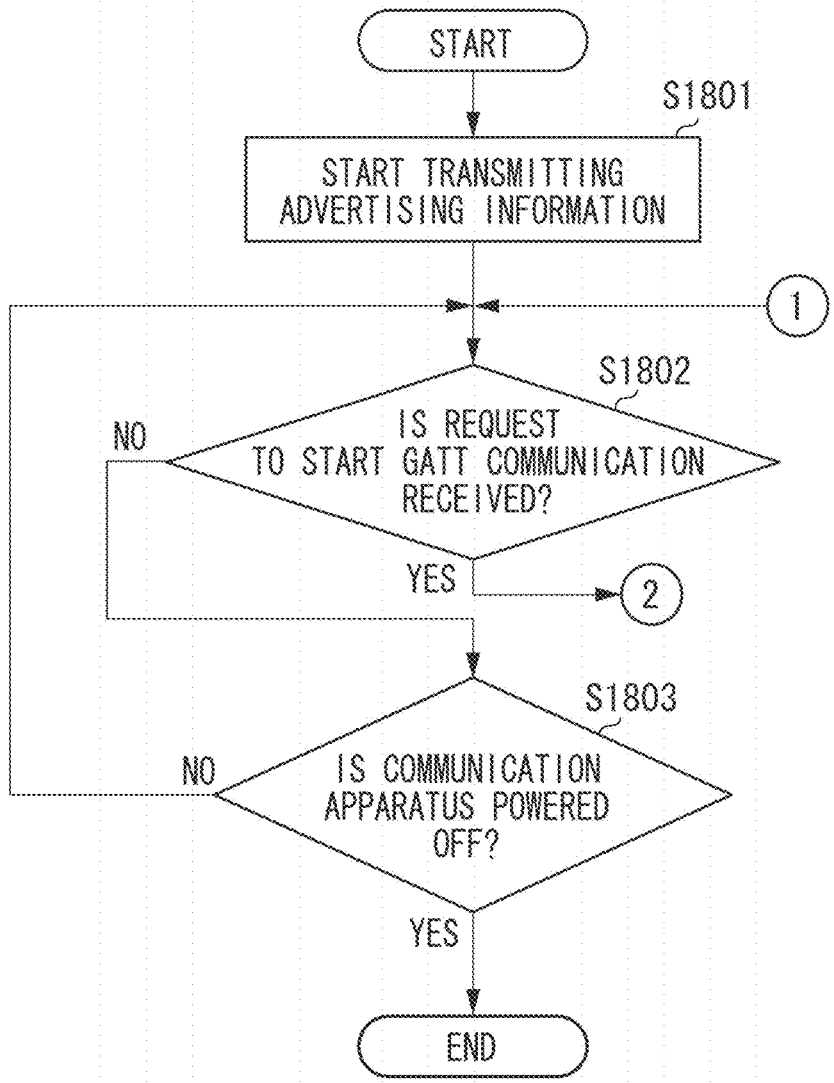

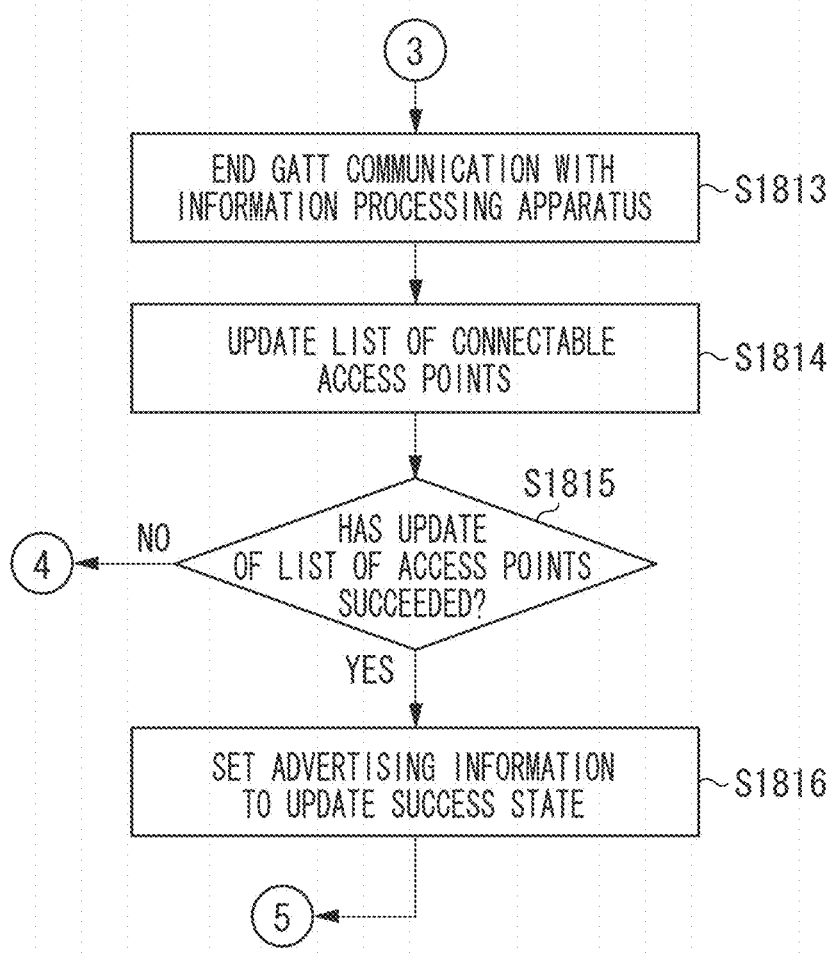

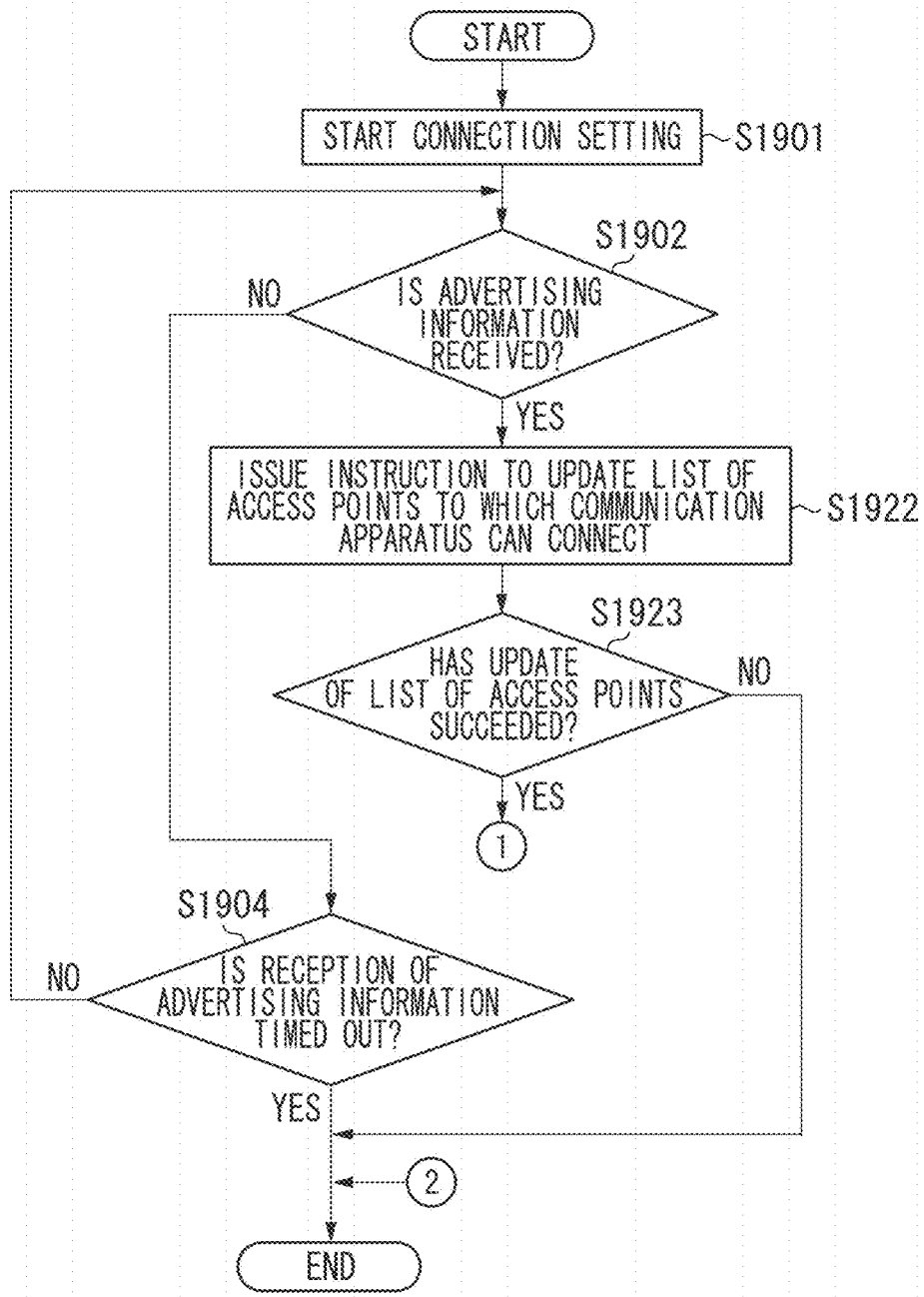

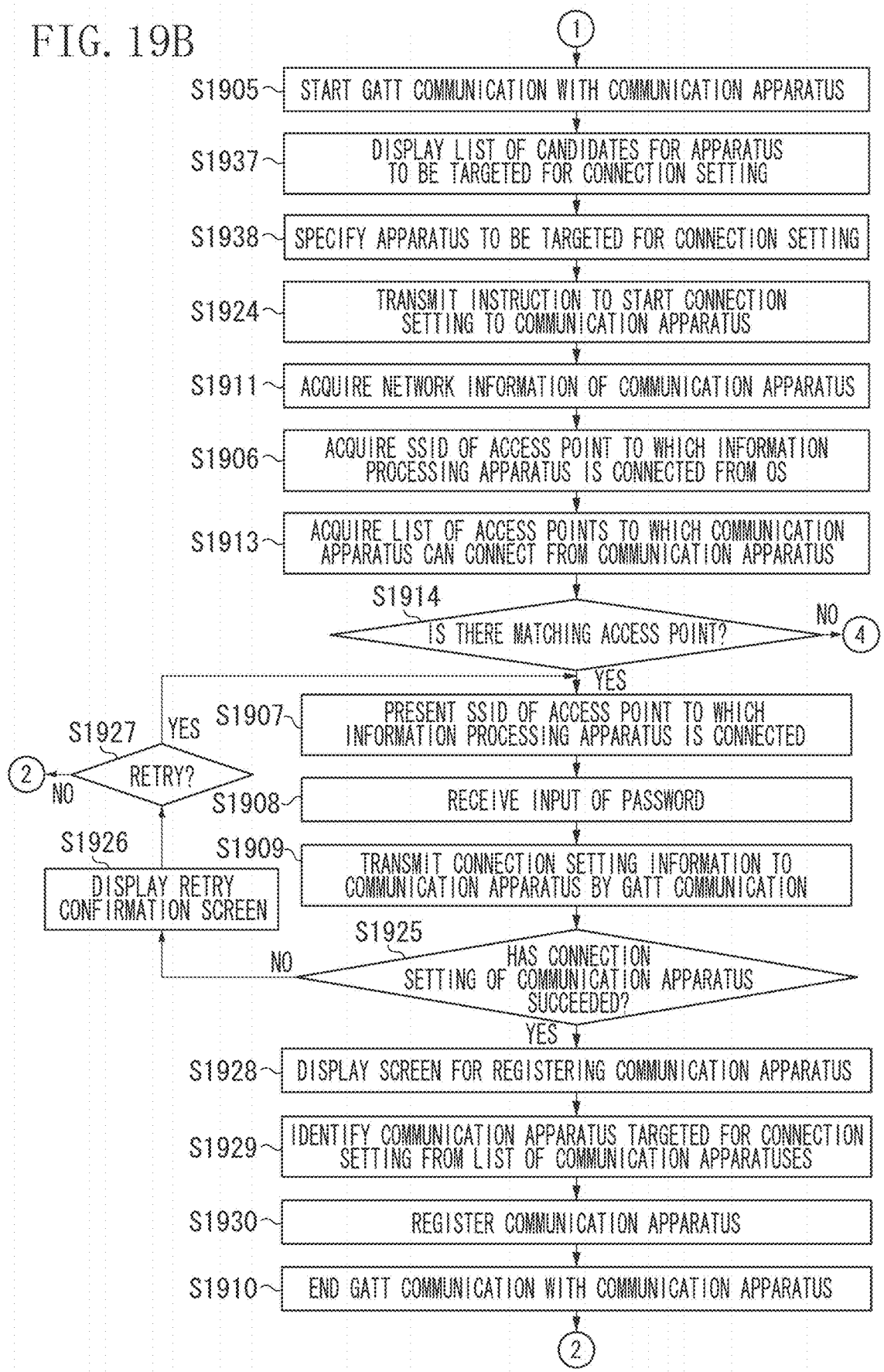

INFORMATION PROCESSING APPARATUS, CONTROL METHOD FOR INFORMATION PROCESSING APPARATUS, AND CONTROL METHOD FOR COMMUNICATION SYSTEM

CROSS REFERENCE TO RELATED APPLICATIONS

The present application is a continuation of U.S. patent application Ser. No. 16/908,079 filed on Jun. 22, 2020, which is a continuation of U.S. Pat. No. 10,701,742 issued on Jun. 30, 2020, which is a continuation of U.S. Pat. No. 10,244,563 issued on Mar. 26, 2019, which is a continuation of U.S. Pat. No. 9,999,077 issued on Jun. 12, 2018, which claims priority from Japanese Patent Application No. 2016-016485 filed Jan. 29, 2016 and Japanese Patent Application No. 2016-072785 filed Mar. 31, 2016, all of which are hereby incorporated by reference herein in their entireties.

BACKGROUND

Field

The present disclosure relates to an information processing apparatus, a control method for an information processing apparatus, and a control method for a communication system.

Description of the Related Art

As a method for connecting an information processing apparatus, such as a smart-phone, to a communication apparatus, such as a printer usable in a network, by a communication method, such as wireless local area network (LAN) communication, there is a method that connects them via an access point outside the communication apparatus, such as a wireless LAN router. This connection method is called an infrastructure connection. Establishment of the infrastructure connection allows the information processing apparatus and the communication apparatus to, for example, bi-directionally communicate with each other, and connect to the Internet to use a service offered on the Internet.

Japanese Patent Application Laid-Open No. 2007-048211 discusses an apparatus that acquires a list of access points connectable from a communication apparatus, allows a user to select one access point from this list, and connects to the communication apparatus as the infrastructure connection with use of the selected access point.

The method discussed in Japanese Patent Application Laid-Open No. 2007-048211 can establish the infrastructure connection. However, due to a recent trend that a configuration using the communication between apparatuses has been increasingly prevailing, making the establishment of the infrastructure connection further easier and simpler has been demanded more than ever. The present invention is directed to an information processing apparatus, a control method for an information processing apparatus, and a control method for a communication system that allow the infrastructure connection to be further easier and simpler.

SUMMARY

According to an aspect an embodiment, a control method for an information processing apparatus including a first communication unit configured to connect to and communicate with a communication apparatus by a first wireless communication method, and a second communication unit configured to connect to and communicate with an access point by a second wireless communication method different from the first wireless communication method, includes receiving a signal containing connection information for communicating with the communication apparatus by the first wireless communication method from the communication apparatus, transmitting a request for starting communication by the first wireless communication method to the communication apparatus based on the signal and establishing a connection between the first communication unit and the communication apparatus by the first wireless communication method, and transmitting, by the first communication unit, information about the access point to which the second communication unit is connected to the communication apparatus to which the first communication unit is connected, wherein, in a case where the information about the access point to which the second communication unit is connected is received, the communication apparatus connects to and communicates with the access point to which the second communication unit is connected by the second wireless communication method, and wherein, in a case where the communication apparatus is connected to the access point to which the second communication unit is connected by the second wireless communication method, the information processing apparatus becomes able to carry out communication by the second communication unit with the communication apparatus via the access point to which the second communication unit is connected.

Further features will become apparent from the following description of exemplary embodiments with reference to the attached drawings.

BRIEF DESCRIPTION OF THE DRAWINGS

FIG. 6 is a flowchart illustrating processing performed by an information processing apparatus according to a second exemplary embodiment.

FIG. 8 illustrates processing for broadcasting advertisement information and receiving connection request information.

FIG. 9 illustrates advertisement in Bluetooth® Low Energy.

FIG. 10 illustrates a structure of the advertisement information.

FIG. 11 (including FIGS. 11A and 11B) is a flowchart illustrating processing performed by an information processing apparatus according to a fourth exemplary embodiment.

FIG. 14 is a flowchart illustrating processing performed by the information processing apparatus according to the fifth exemplary embodiment.

FIG. 15 (including FIGS. 15A and 15B) is a flowchart illustrating processing performed by a communication apparatus according to the fifth exemplary embodiment.

DESCRIPTION OF THE EMBODIMENTS

In the following description, exemplary embodiments will be described by way of examples with reference to the drawings. However, additional embodiments, created by arbitrarily modifying or improving the exemplary embodiments that will be described below within a range that does not depart from the spirit of the present disclosure based on ordinary knowledge of those skilled in the art, are applicable.

An information processing apparatus and a communication apparatus included in a communication system according to a first exemplary embodiment will be described. In the present exemplary embodiment, a smart-phone will be described as the information processing apparatus by way of example, but the information processing apparatus is not limited thereto. Various kinds of apparatuses, such as a mobile terminal, a notebook personal computer (PC), a tablet terminal, a personal digital assistance (PDA), and a digital camera, can be employed as the information processing apparatus. Further, in the present exemplary embodiment, a printer will be described as the communication apparatus by way of example, but the communication apparatus is not limited thereto. Various kinds of apparatuses that can wirelessly communicate with the information processing apparatus can be employed as the communication apparatus. For example, any printer printers such as an inkjet printer, a full-color laser beam printer, a monochrome printer, and the like can be employed as the communication apparatus. Further, the apparatuses employable as the communication apparatus include not only the printer but also a copy machine, a facsimile apparatus, a mobile terminal, a smart-phone, a notebook PC, a tablet terminal, a PDA, a digital camera, a music playback device, a television, and the like. Besides them, a multifunctional peripheral having a plurality of functions, such as a copy function, a facsimile (FAX) function, and a print function, can also be employed as the communication apparatus.

Figure 1:
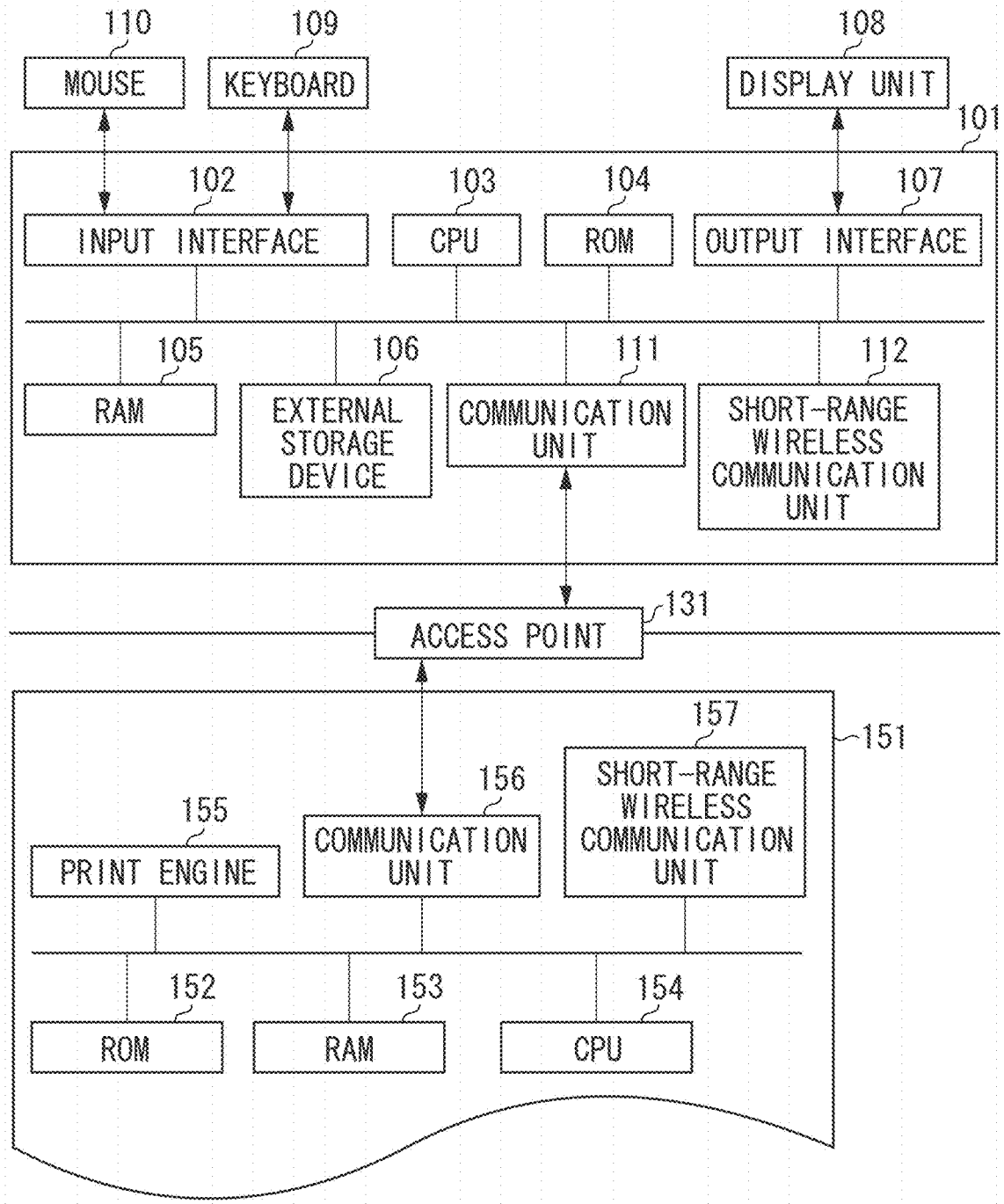
FIG. 1 is a block diagram illustrating an example of configurations of an information processing apparatus and a communication apparatus according to an exemplary embodiment.

First, configurations of the information processing apparatus according to the present exemplary embodiment, and the communication apparatus communicable with the information processing apparatus according to the present exemplary embodiment will be described with reference to a block diagram illustrated in FIG. 1. Further, in the present exemplary embodiment, the information processing apparatus and the communication apparatus will be described citing the following configurations as examples thereof, but the present exemplary embodiment is applicable to an apparatus communicable with the communication apparatus, and functions thereof are not especially limited as illustrated in FIG. 1.

An information processing apparatus 101 is the information processing apparatus according to the present exemplary embodiment. The information processing apparatus 101 includes an input interface 102, a central processing unit (CPU) 103, a read only memory (ROM) 104, a random access memory (RAM) 105, an external storage device 106, an output interface 107, a display unit 108, a communication unit 111, a short-range wireless communication unit 112.

The input interface 102 is an interface for receiving a data input and an operation instruction from a user based on an operation performed on a mouse 110 and a keyboard 109.

The CPU 103 is a system control unit, and controls the entire information processing apparatus 101.

The ROM 104 stores fixed data, such as a control program to be executed by the CPU 103, a data table, and an embedded operating system (hereinbelow, referred to OS) program. In the present exemplary embodiment, each control program stored in the ROM 104 performs software execution control, such as scheduling, task switching, and interruption processing, under the management of the embedded OS stored in the ROM 104.

The RAM 105 is embodied with use of a static random access memory (SRAM) or the like, which requires a backup power source. The RAM 105 holds data with use of a not-illustrated primary battery for a data backup, and therefore can store important data, such as a program control variable, without volatilizing it. Further, a memory area storing setting information of the information processing apparatus 101, management data of the information processing apparatus 101, and the like is also prepared in the RAM 105. Further, the RAM 105 is also used as a main memory and a work memory of the CPU 103.

The external storage device 106 stores an application that provides a print execution function, a print information generation program that generates print information interpretable by a communication apparatus 151, and the like. Further, the external storage device 106 stores various kinds of programs, such as an information transmission/reception control program for transmission and reception between the information processing apparatus 101 and the communication apparatus 151 to which the information processing apparatus 101 is connected via the communication unit 111, and various kinds of information to be used by these programs.

The output interface 107 is an interface for controlling the display unit 108 to display data and notify the user of a state of the information processing apparatus 101.

The display unit 108 is embodied with use of a light-emitting diode (LED), a liquid crystal display (LCD), or the like, and displays the data and notifies the user of the state of the information processing apparatus 101. The information processing apparatus 101 may receive the input from the user via the display unit 108 by including an operation unit, such as a key for inputting a numerical value, a mode setting key, an enter key, a cancel key, and a power source key provided on the display unit 108.

The communication unit 111 is a unit that allows the information processing apparatus 101 to connect to an apparatus such as the communication apparatus 151 and an access point 131, and carry out data communication. For example, the communication unit 111 can connect to an access point (not illustrated) in the communication apparatus 151. When the communication unit 111 and the access point in the communication apparatus 151 connect to each other, this connection allows the information processing apparatus 101 and the communication apparatus 151 to communicate with each other. The communication unit 111 may directly communicate with the communication apparatus 151 by wireless communication, or may communicate with the communication apparatus 151 via an external apparatus existing outside the information processing apparatus 101 and the communication apparatus 151. Apparatuses possible as the external apparatus include an external access point (e.g., access point 131) existing outside the information processing apparatus 101 and the communication apparatus 151, and an apparatus other than the access point that can relay the communication. Examples of a wireless communication method therefor include Wireless Fidelity (Wi-Fi®), and Bluetooth®. Further, examples of the access point 131 include a device such as a wireless local area network (LAN) router. In the present exemplary embodiment, a method in which the information processing apparatus 101 and the communication apparatus 151 directly connect to each other without intervention of the external access point will be referred to as a direct connection method. Further, a method in which the information processing apparatus 101 and the communication apparatus 151 connect to each other via the external access point will be referred to as an infrastructure connection method.

The short-range wireless communication unit 112 is a unit that allows the information processing apparatus 101 to wirelessly connect to an apparatus such as the communication apparatus 151 at a short range and carry out the data communication, and uses a different communication method from the communication unit 111 to carry out the communication. The short-range wireless communication unit 112 can connect to, for example, a short-range wireless communication unit 157 in the communication apparatus 151. Examples of a communication method therefor include Bluetooth® Low Energy and Wi-Fi® Aware.

In the present exemplary embodiment, assume that the communication unit 111 is configured to be able to realize faster communication than the short-range wireless communication unit 112. Further, assume that the short-range wireless communication unit 112 is configured to be used to exchange communication information for carrying out the communication by the communication unit 111, with an apparatus such as the communication apparatus 151.

The communication apparatus 151 is the communication apparatus according to the present exemplary embodiment. The communication apparatus 151 includes a ROM 152, a RAM 153, a CPU 154, a print engine 155, a communication unit 156, and the short-range wireless communication unit 157.

The communication unit 156 includes an access point for connecting to an apparatus such as the information processing apparatus 101 as the access point inside the communication apparatus 151. This access point is connectable to the communication unit 111 of the information processing apparatus 101. The communication unit 156 may directly communicate with the information processing apparatus 101 by the wireless communication, or may communicate with the information processing apparatus 101 via the access point 131. Examples of a communication method therefor include Wi-Fi® and Bluetooth®. Further, the communication unit 156 may include hardware that functions as the access point, or may operate as the access point with use of software for causing the communication unit 156 to function as the access point.

The short-range wireless communication unit 157 is a unit that allows the communication apparatus 151 to wirelessly connect to an apparatus such as the information processing apparatus 101 at a short range, and is connectable to, for example, the short-range wireless communication unit 112 in the information processing apparatus 101. Examples of a communication method therefor include Bluetooth® Low Energy and Wi-Fi® Aware.

In the present exemplary embodiment, assume that the communication unit 156 is configured to be able to realize faster communication than the short-range wireless communication unit 157. Further, assume that the short-range wireless communication unit 157 is configured to be used to exchange communication information for carrying out the communication by the communication unit 156, with an apparatus such as the information processing apparatus 101.

The RAM 153 is embodied with use of an SRAM or the like, which requires a backup power source. The RAM 153 holds data with use of a not-illustrated primary battery for a data backup, and therefore can store important data, such as a program control variable, without volatilizing it. Further, a memory area storing setting information of the communication apparatus 151, management data of the communication apparatus 151, and the like is also prepared in the RAM 153. Further, the RAM 153 is also used as a main memory and a work memory of the CPU 154, and stores a reception buffer for temporarily storing the print information received from the information processing apparatus 101 or the like, and various kinds of information.

The ROM 152 stores fixed data, such as a control program to be executed by the CPU 154, a data table, and an OS program. In the present exemplary embodiment, each control program stored in the ROM 152 performs software execution control, such as scheduling, task switching, and interruption processing, under the management of the embedded OS stored in the ROM 152.

The CPU 154 is a system control unit, and controls the entire communication apparatus 151.

The communication apparatus 151 applies a recording material, such as ink, onto a recording medium, such as paper, based on information stored in the print engine 155 and the RAM 153 and a print job received from the information processing apparatus 101 or the like, thereby forming an image on the recording medium and outputting a print result. At this time, the print job transmitted from the information processing apparatus 101 or the like has a large transmission data volume and therefore requires high-speed communication, whereby the communication apparatus 151 receives the print job via the communication unit 156 capable of achieving faster communication than the short-range wireless communication unit 157.

A memory such as an external hard disk drive (HDD) and a Secure Digital (SD) card may be mounted on the communication apparatus 151 as an optional device, and the information stored in the communication apparatus 151 may be stored in this memory.

Further, a connection mode of the communication apparatus 151 according to the present exemplary embodiment is set by connection setting processing, which will be described below, and the communication apparatus 151 communicates with the information processing apparatus 101 while connecting thereto in a manner based on the set connection mode. For the communication apparatus 151 according to the present exemplary embodiment, an infrastructure connection mode is set as the connection mode when the communication is carried out by the infrastructure connection, and a direct connection mode is set as the connection mode when the communication is carried out by the direct connection.

In the present example, how to divide the processing between the information processing apparatus 101 and the communication apparatus 151 has been indicated as described above by way of example, but is not especially limited to this division configuration, and the processing may be divided in a different manner.

The present exemplary embodiment includes processing in which the information processing apparatus 101 registers an access point to be used for the infrastructure connection, in the communication apparatus 151 when the information processing apparatus 101 and the communication apparatus 151 connect to each other as the infrastructure connection (the connection setting processing). This processing will be described below. In the present exemplary embodiment, the connection setting processing will be described, assuming that the information processing apparatus 101 is connected to the access point 131, and registers the access point 131 in the communication apparatus 151 as the access point to be used for the infrastructure connection. Further, in the present exemplary embodiment, the connection setting processing will be described, assuming that the short-range wireless communication unit 112 and the short-range wireless communication unit 157 communicate with each other by Bluetooth® Low Energy. In the present exemplary embodiment, the short-range wireless communication unit 157 functions as an advertiser (or a slave) that broadcasts advertisement information, which will be described below, and the short-range wireless communication unit 112 functions as a scanner (or a master) that receives the advertisement information. Further, the connection setting processing will be described, assuming that the communication unit 111 and the communication unit 156 communicate with each other by the wireless LAN (Wi-Fi®). Further, the connection setting processing will be described, assuming that the connection setting processing is started with the information processing apparatus 101 connected to the access point 131 in advance and the communication apparatus 151 not connected to the access point 131.

Now, processing for transmitting the advertisement information and receiving a Bluetooth® Low Energy connection request defined in the Bluetooth® Low Energy standard will be described with reference to FIG. 8. In the present exemplary embodiment, assume that the short-range wireless communication unit 157 performs the above-described processing, since the short-range wireless communication unit 157 operates as the slave device as described above.

The short-range wireless communication unit 157 carries out the communication while dividing a frequency band of 2.4 GHz into 40 channels (0 to 39 channels (ch)) in the Bluetooth® Low Energy communication method. Among these channels, the short-range wireless communication unit 157 uses thirty-seventh to thirty-ninth channels for transmitting the advertisement information and receiving the Bluetooth® Low Energy connection request, and uses zeroth to thirty-sixth channels for data communication (Generic Attribute Profile (GATT) communication or the like) after the Bluetooth® Low Energy connection. In FIG. 8, a vertical axis represents power consumption of the short-range wireless communication unit 157, and a horizontal axis represents a time, in which power consumption when the advertisement information is transmitted with use of one channel is indicated for each processing procedure. Power Tx 805 represents total power consumption in transmission processing that is processing for broadcasting the advertisement information, and power Rx 806 represents total power consumption in reception processing that is processing for keeping a receiver for receiving the Bluetooth® Low Energy connection request enabled. Transmission power 802 represents instantaneous power consumption consumed by the transmission processing. Further, reception power 803 represents instantaneous power consumption consumed by the reception processing. Further, microcomputer operation power 801 represents instantaneous power consumption when a microcomputer in the short-range wireless communication unit 157 is in operation. The microcomputer is in operation before and after, and even between Tx 805 and Rx 806 because the microcomputer should be started up in advance to perform and stop the transmission processing and the reception processing. Further, in a case where the advertisement information is transmitted with use of a plurality of channels, this leads to an increase in the power consumption as much as the number of channels used to transmit the advertisement information. Further, sleep power 804 corresponds to instantaneous power consumption of the short-range wireless communication unit 157 while the microcomputer is out of operation and the short-range wireless communication unit 157 is in a power-saving state. In this manner, after performing the transmission processing with use of a predetermined channel, the short-range wireless communication unit 157 waits for the transmission of the Bluetooth® Low Energy connection request from the information processing apparatus 101 by performing the reception processing for a predetermined time period with use of the same channel. Upon receiving the Bluetooth® Low Energy connection request from the information processing apparatus 101, the short-range wireless communication unit 157 establishes the Bluetooth® Low Energy connection, and carries out the GATT communication with the information processing apparatus 101.

Further, as illustrated in FIG. 9, the short-range wireless communication unit 157 stops the operation of the microcomputer and is kept in the power-saving state for a predetermined time period, after repeating the processing for transmitting the advertisement information and the reception processing three times for each of the channels. In the following description, a combination of the processing for transmitting the advertisement information and the reception processing with use of the predetermined channel will be referred to as advertisement. Further, a time interval at which the advertisement information is transmitted with use of the predetermined channel will be referred to as an advertising time interval. The number of times that the advertisement is repeated from the execution of the first advertisement to the shift to the power-saving state may be arbitrarily changed as long as this number is three or smaller.

FIG. 10 illustrates one example of a structure of the advertisement information for broadcasting the short-range wireless communication unit 157 to a vicinity of the communication apparatus 151.

Upon start of power supply, the short-range wireless communication unit 157 performs initialization processing and is brought into an advertising state. Upon being brought into the advertising state, the short-range wireless communication unit 157 regularly broadcasts the advertisement information to the vicinity based on the advertising time interval. The advertisement information is a signal containing basic header information (i.e., identification information for identifying the apparatus transmitting this advertisement information), and includes a header 1001 and a payload

1002. The information processing apparatus 101 can recognize the presence of the communication apparatus 151 by receiving this advertisement information. Further, the information processing apparatus 101 can connect to the communication apparatus 151 as the Bluetooth® Low Energy connection by transmitting the Bluetooth® Low Energy connection request to the communication apparatus 151. The header 1001 is an area for storing a type of the advertisement information, information indicating a size of the payload 1002, and the like. The payload 1002 stores a device name 1003 as the identification information, information about a mounted profile, connection information 1004 for connecting to the communication apparatus 151 as the Bluetooth® Low Energy connection, transmission power (Tx Power) 1005 when the advertisement information is transmitted, and the like. Identification information 1006 of the communication apparatus 151 may be contained in the advertisement information. Examples of information used as the identification information 1006 of the communication apparatus 151 include a media access control (MAC) address of the communication apparatus 151, information indicating a service of the communication apparatus 151, and a service set identifier (SSID) and a password for the access point in the communication apparatus 151.

Further, in the present exemplary embodiment, pairing processing is performed. The pairing processing is performed for carrying out authentication between the information processing apparatus 101 and the communication apparatus 151, and reading and writing data between the apparatuses by the GATT communication. GATT is a profile that handles reading and writing (reception and transmission) of information in the Bluetooth® Low Energy standard. Then, the GATT communication is communication in which the information processing apparatus 101 and the communication apparatus 151 play roles of a GATT client and a GATT server, respectively, and the information processing apparatus 101 reads and writes information from and into the communication apparatus 151 according to the profile based on GATT. Assume that the communication apparatus 151 is configured to prohibit the information processing apparatus 101 from reading and writing the information by the GATT communication in a state where the information processing apparatus 101 and the communication apparatus 151 are not paired with each other. This configuration can prevent or make less likely inappropriate establishment of the communication between the information processing apparatus 101 and the communication apparatus 151 not paired with each other, and, for example, careless acquisition of the information held in the communication apparatus 151 by the information processing apparatus 101 not paired with the communication apparatus 151.

Figure 16A:
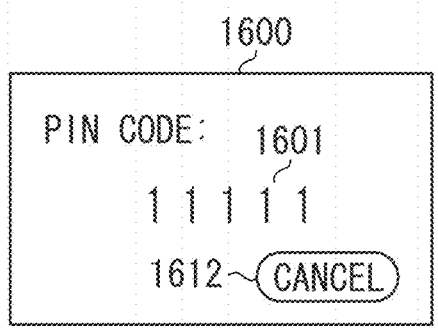
FIGS. 16A and 16B illustrate examples of screens regarding a personal identification number (PIN) code.
Figure 16B:
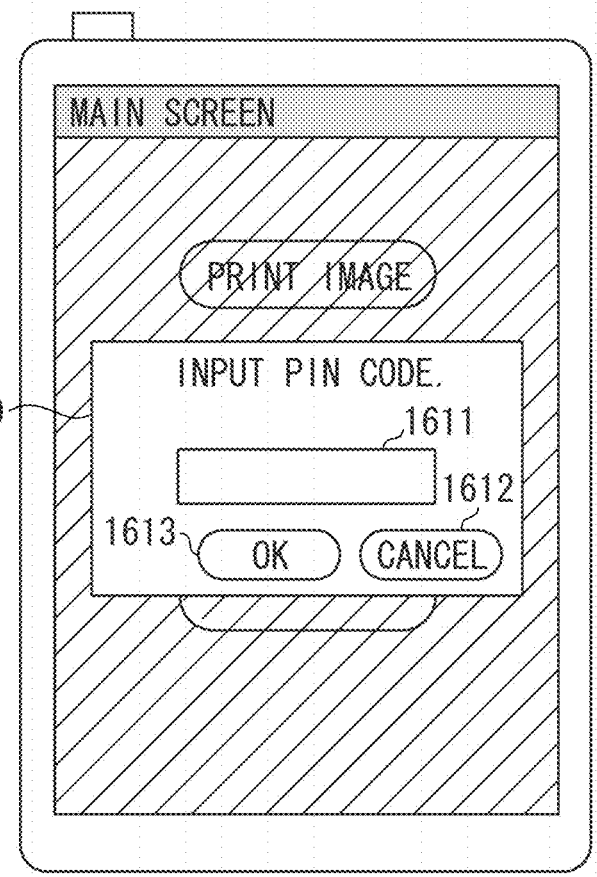

Details of the pairing processing will be described. First, when a print application, which will be described below, is launched and an initial screen (home screen) to be displayed by the print application is displayed on the display unit 108, the information processing apparatus 101 starts a search for advertisement information having specific apparatus information. The specific apparatus information is, for example, a universally unique identifier (UUID) or a MAC address of an apparatus corresponding to the print application (e.g., a printer). Then, upon receiving the advertisement information having the specific apparatus information, the information processing apparatus 101 transmits the Bluetooth® Low Energy connection request (CONNECT_REQ) to the apparatus that has transmitted this advertisement information (the communication apparatus 151 in the present example), and establishes the Bluetooth® Low Energy connection between the apparatuses. Then, if the pairing with the communication apparatus 151 is not completed, the information processing apparatus 101 displays a screen for prompting the user to conduct the pairing on the display unit 108. Then, if being instructed to conduct the pairing by the user, the information processing apparatus 101 transmits a pairing request to the communication apparatus 151 by communication according to the security manager protocol. Assume that the communication between the apparatuses is carried out according to the security manager protocol until the pairing is completed. Upon receiving the pairing request, the communication apparatus 151 displays a personal identification number (PIN) code display screen 1600 like an example illustrated in FIG. 16A on a display unit (not illustrated) provided to the communication apparatus 151. A PIN code 1601 and a cancel button 1602 for canceling the pairing processing are displayed on the PIN code display screen 1600. Then, upon transmitting the pairing request, the information processing apparatus 101 displays a PIN code input screen 1610 like an example illustrated in FIG. 16B on the display unit 108. A PIN code input area 1611, an OK button 1613, and the cancel button 1612 are displayed on the PIN code input screen 1610. The PIN code input area 1611 is an area for receiving an input of the PIN code 1601 from the user. The OK button 1613 is a button for transmitting the input PIN code 1601 to the communication apparatus 151. The cancel button 1612 is a button for canceling the pairing processing. When the OK button 1613 is pressed with the PIN code 1601 being input in the PIN code input area 1611, the information processing apparatus 101 transmits information containing the input PIN code 1601 to the communication apparatus 151. The communication apparatus 151 determines whether the PIN code 1601 contained in the received information matches the PIN code 1601 displayed on the PIN code display screen 1600, and permits the information processing apparatus 101 to be paired with the communication apparatus 151 if it is determined that these PIN codes 1601 match each other. More specifically, the communication apparatus 151 transmits a link key generated based on the PIN code 1601 by a predetermined method to the information processing apparatus 101 with use of the security manager protocol (SMP) defined in the Bluetooth® Low Energy standard. In this manner, the link key is stored in each of a storage area provided in the information processing apparatus 101 (e.g., the ROM 104) and a storage area provided to the communication apparatus 151 (e.g., the ROM 152). The pairing is completed by that, and the execution of the Bluetooth® Low Energy communication is permitted between the apparatuses after that. Upon the completion of the pairing, the information processing apparatus 101 closes the PIN code display screen 1600 and displays an originally displayed screen again.

After the pairing is completed, the information processing apparatus 101 notifies the communication apparatus 151 of the link key stored in the storage area at the time of the pairing processing, when transmitting a GATT communication request to the communication apparatus 151. Upon receiving the GATT communication request, the communication apparatus 151 compares the link key stored in the storage area at the time of the pairing processing with the link key which the communication apparatus 151 is notified of, and confirms whether the apparatus that has issued the GATT communication request is the already paired apparatus. Then, if being able to confirm that this apparatus is the already paired apparatus, the communication apparatus 151 starts the reading and writing of the information by the GATT communication with the information processing apparatus 101. Due to this mechanism, once the processing for pairing with the communication apparatus 151 is completed, the information processing apparatus 101 can carry out the GATT communication with the communication apparatus 151 without requiring the user to input the PIN code after that. In the above-described example, the acquisition of the PIN code 1601 has been described assuming that the communication system is configured to allow the user to input the PIN code 1601 displayed on the PIN code display screen 1600 into the PIN code input area 1611, but is not limited to this configuration. For example, the communication system may be configured in such a manner that the PIN code 1601 is prepared as fixed information (not arbitrarily changeable by the user), and is stored into the information processing apparatus 101 together with installation of the print application, which will be described below. By employing this method, the communication system can be configured in such a manner that the communication apparatus 151 is notified of the PIN code 1601 without requiring the user to input it. Further, the timing at which the pairing processing is started is also not limited to the above-described configuration, and may be, for example, a timing when the user issues a print instruction via the print application or a timing before the Bluetooth® Low Energy connection is carried out in the connection setting processing, which will be described below.

Now, processing for registering an access point that is a connection destination of the communication apparatus 151 (connection setting processing) will be described. The information processing apparatus 101 performs the connection setting processing while a predetermined application stored in the ROM 104, the external storage device 106, or the like is launched. The predetermined application is an application for setting the access point that is the connection destination of the communication apparatus 151, and causing the communication apparatus 151 to print image data, document data, or the like in the information processing apparatus 101, and will be hereinbelow, referred to as an application for printing. In addition to the function of setting the access point that is the connection destination of the communication apparatus 151, and the print function, the application for printing may also have another function. For example, in a case where the communication apparatus 151 is equipped with a scan function, the application for printing may have a function of causing the communication apparatus 151 to scan a document set on the communication apparatus 151, a function of configuring another setting of the communication apparatus 151, a function of confirming a state of the communication apparatus 151, and/or the like.

Figure 4:
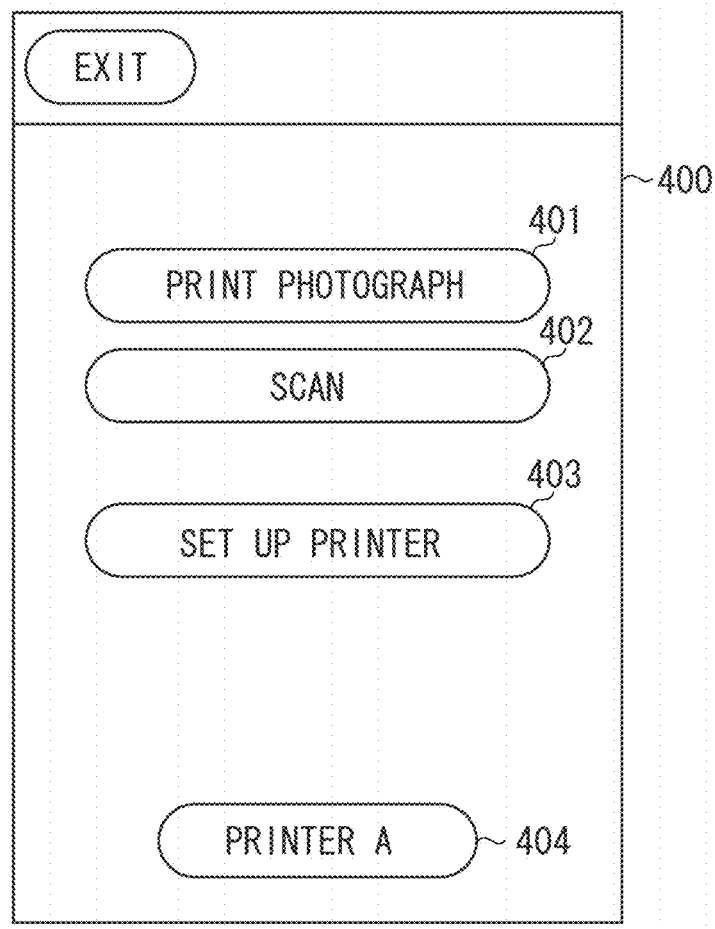
FIG. 4 illustrates an example of a screen when an application for printing is launched.

FIG. 4 illustrates one example of a screen displayed on the display unit 108 when the application for printing is launched. The user can use the functions provided in the communication apparatus 151, such as printing a desired image and setting the communication apparatus 151, via a startup screen 400. Upon detecting that a print button 401 is pressed, the information processing apparatus 101 causes the communication apparatus 151 to execute printing. And upon detecting that a scan button 402 is pressed, the information processing apparatus 101 causes the communication apparatus 151 to execute scanning. And upon detecting that a printer setup button 403 is pressed, the information processing apparatus 101 starts the connection setting processing. In the present exemplary embodiment, assume that a shift of the communication apparatus 151 to a connection setting mode is necessary to perform the connection setting processing on the communication apparatus 151. The connection setting mode is a mode set to the communication apparatus 151 when the connection mode is to be set to the communication apparatus 151, and is set to the communication apparatus 151, for example, when the user enters a predetermined input onto an input interface (not illustrated) provided in the communication apparatus 151. When being in the connection setting mode, the communication apparatus 151 starts transmitting the advertisement information via the short-range wireless communication unit 157. The timing at which the communication apparatus 151 starts transmitting the advertisement information is not limited to the above-described configuration, and may be, for example, a timing when the communication apparatus 151 is powered on and a timing when a predetermined operation to enable the Bluetooth® Low Energy function is performed. In this case, the connection setting mode does not have to be set to the communication apparatus 151 to perform the connection setting processing on the communication apparatus 151.

Figure 2:
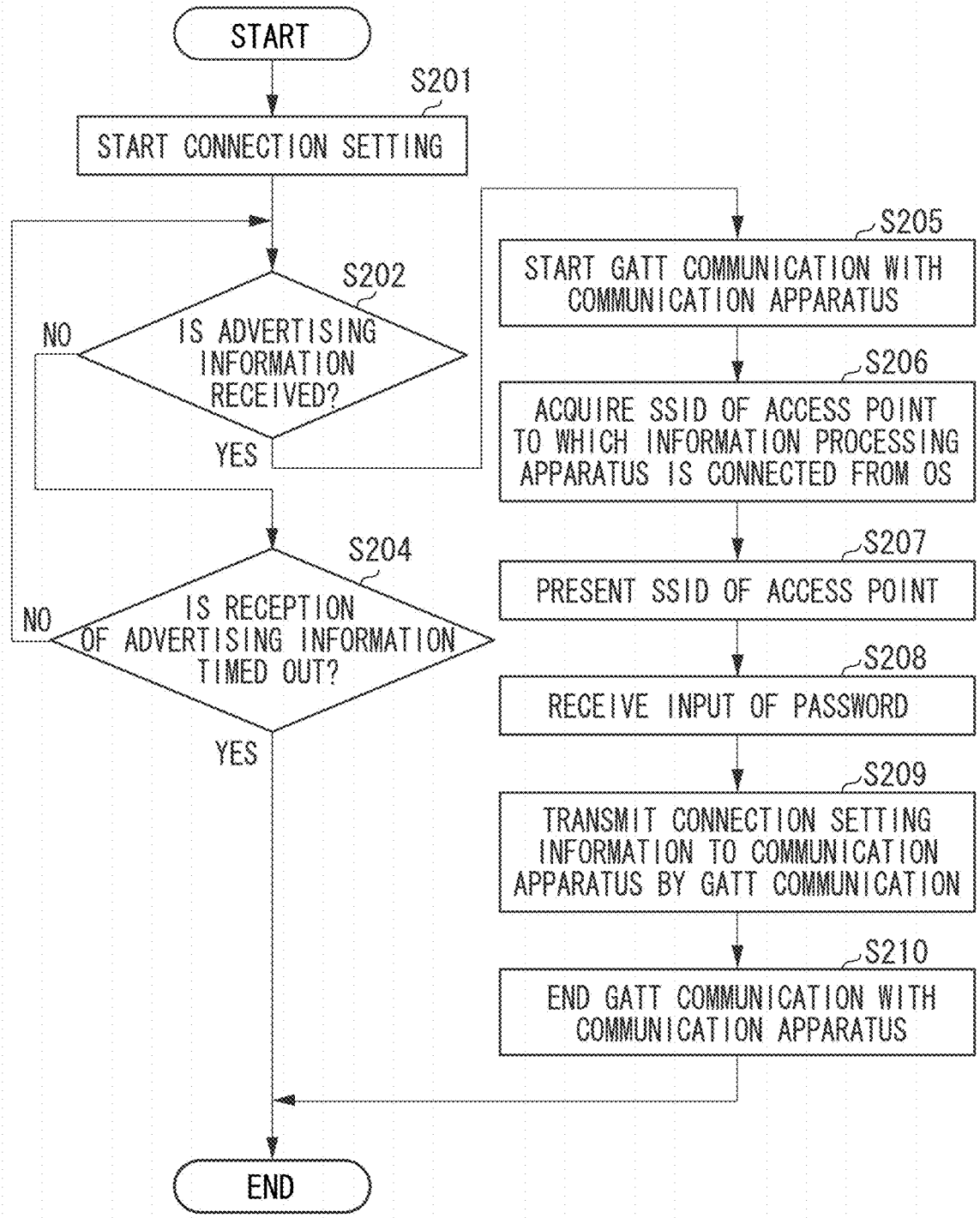
FIG. 2 is a flowchart illustrating processing performed by an information processing apparatus according to a first exemplary embodiment.

FIG. 2 is a flowchart illustrating a flow of the connection setting processing performed by the information processing apparatus 101. For example, the CPU 103 reads out the program stored in the ROM 104, the external storage device 106, or the like into the RAM 105, and executes the read program, by which the flowchart illustrated in FIG. 2 is realized. Further, assume that the processing illustrated in the flowchart of FIG. 2 is started when the printer setup button 403 is pressed with the pairing completed between the information processing apparatus 101 and the communication apparatus 151. Further, assume that the communication apparatus 151 has shifted to the connection setting mode at this time.

First, in step S201, the CPU 103 detects that the information processing apparatus 101 is instructed to perform the connection setting processing by the user, and is brought into a scanning state, which is a state capable of receiving the advertisement information.

Next, in step S202, the CPU 103 determines whether the advertisement information transmitted from the short-range wireless communication unit 157 of the communication apparatus 151 is received by the short-range wireless communication unit 112. More specifically, the CPU 103 determines whether the advertisement information is received by the short-range wireless communication unit 112, and whether the identification information indicating the communication apparatus 151 is contained in the received advertisement information. If the CPU 103 determines that the advertisement information is received by the short-range wireless communication unit 112 (YES in step S202), the processing proceeds to step S205. On the other hand, if the CPU 103 determines that the advertisement information is not received by the short-range wireless communication unit 112 (NO in step S202), the processing proceeds to step S204. In step S204, the CPU 103 determines whether a predetermined time period has elapsed from the start of the connection setting processing (whether the reception of the advertisement information is timed out). If the CPU 103 determines that the reception of the advertisement information is not timed out (NO in step S204), the processing proceeds to step S202 again. On the other hand, if the CPU 103 determines that the reception of the advertisement information is timed out (YES in step S204), the processing is ended. At this time, the CPU 103 may display a screen for notifying the user that the reception of the advertisement information is timed out on the display unit 108.

In step S205, the CPU 103 establishes the Bluetooth® Low Energy connection based on the received advertisement information, and transmits a request to start the GATT communication to the communication apparatus 151. When the request to start the GATT communication is received by the communication apparatus 151, the GATT communication is started between the communication apparatus 151 and the information processing apparatus 101 by this reception. Now, in the GATT communication defined in the Bluetooth® Low Energy standard, one of the apparatuses serves as the master and the other of the apparatuses serves as the slave, which enables the bidirectional communication between the apparatuses. In the present exemplary embodiment, the communication apparatus 151 serves as the slave side, and the information processing apparatus 101 serves as the master side. Subsequently, in step S206, the CPU 103 acquires the SSID of the access point 131 to which the communication unit 111 is connected from the OS installed in the information processing apparatus 101. The information about the access point 131 to which the communication unit 111 is connected is already acquired from the access point 131 by the OS before the GATT communication is started. The information about the access point 131 to which the communication unit 111 is connected may be acquired from, for example, a beacon according to the Wi-Fi® standard that is issued from the access point 131. Alternatively, the information about the access point 131 may be acquired by inquiring of the access point 131 after acquiring this beacon and establishing the Wi-Fi® connection. The acquisition of the information about the access point 131 to which the communication unit 111 is connected is not limited to the configuration that acquires it from the OS. For example, the CPU 103 may acquire the information about the access point 131 by inquiring of the access point 131 in step S206.

Figure 5:
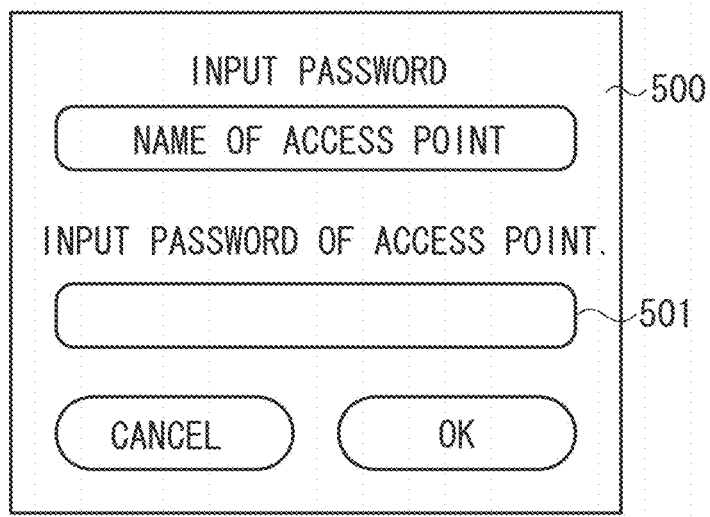
FIG. 5 illustrates an example of a password input screen.

Subsequently, in step S207, the CPU 103 displays the SSID acquired from the OS in step S206, and displays a screen for inputting a password for using the access point corresponding to this SSID (the access point 131 in the present example) on the display unit 108. At this time, for example, a screen 500 illustrated in FIG. 5 is displayed as the screen for inputting the password. In step S208, the information processing apparatus 101 receives an input of the password for using the access point 131 from the user. At this time, the CPU 103 acquires password information input by the user onto an input unit 501.

Subsequently, in step S209, the CPU 103 transmits connection setting information for registering the access point 131 as the connection destination of the communication apparatus 151 into the communication apparatus 151 by the GATT communication. In this case, the connection setting information stores therein the SSID of the access point 131 acquired in step S206, the password acquired in step S208, a command for setting the connection mode of the communication apparatus 151, and the like. In the present exemplary embodiment, the command for setting the connection mode of the communication apparatus 151 is a command for setting an infrastructure connection mode to the communication apparatus 151. Upon receiving the connection setting information, the communication apparatus 151 connects to the access point 131. In this manner, the information processing apparatus 101 and the communication apparatus 151 connect to the same access point 131, which allows the information processing apparatus 101 and the communication apparatus 151 to connect to each other as the infrastructure connection, thereby carrying out the high-speed communication by the wireless LAN. Therefore, after that, when the information processing apparatus 101 is instructed to perform, for example, processing for transmitting the print job by the user, the wireless LAN communication is carried out between the information processing apparatus 101 and the communication apparatus 151 by this instruction. Subsequently, in step S210, the CPU 103 ends the GATT communication between the communication apparatus 151 and the information processing apparatus 101, and then the connection setting processing is ended. At this time, if being already connected to the access point 131, the communication apparatus 151 does not have to newly perform processing for connecting to the access point 131. In other words, the communication apparatus 151 may perform the processing for connecting to the access point 131 if being not connected to any access point or being connected to an access point other than the access point 131.

In this manner, in the present exemplary embodiment, the information processing apparatus 101 transmits the information about the access point 131 to be registered as the connection destination of the communication apparatus 151 into the communication apparatus 151 by a communication method other than the communication method used for the connection to this access point 131. By being configured in this manner, the information processing apparatus 101 can establish the infrastructure connection with the communication apparatus 151 while maintaining the connection to the access point 131. As a result, the user does not have to be bothered with cumbersome processing such as changing the connection destination of the information processing apparatus 101 and setting the connection destination back to the original destination after the connection setting processing is ended, so that the present exemplary embodiment can improve convenience for the user at the time of the connection setting processing.

Further, in the present exemplary embodiment, the information processing apparatus 101 transmits the information about the access point 131 to which the communication unit 111 is connected to the communication apparatus 151, and causes the communication apparatus 151 to connect to this access point 131, thereby establishing the infrastructure connection. In this manner, the access point 131 to which the information processing apparatus 101 is already connected can be used for the infrastructure connection, whereby the information processing apparatus 101 can establish the infrastructure connection without switching the communication destination of the communication unit 111. Further, normally, the user keeps the information processing apparatus 101 connected to an access point that the user usually uses, and the usually used access point is often used for the infrastructure connection as well. In the present exemplary embodiment, the infrastructure connection is carried out with use of the access point to which the communication unit 111 is connected, and therefore can be carried out with use of an appropriate access point (the access point that the user usually uses). Further, in the present exemplary embodiment, the information processing apparatus 101 does not have to perform processing such as causing the user to select the access point to be used for the infrastructure connection. Therefore, the information processing apparatus 101 can prevent or make less likely a user's inappropriate selection of an access point unsuitable for the infrastructure connection, and omit a cumbersome operation for the selection, thereby improving usability for the user.

Figure 3:
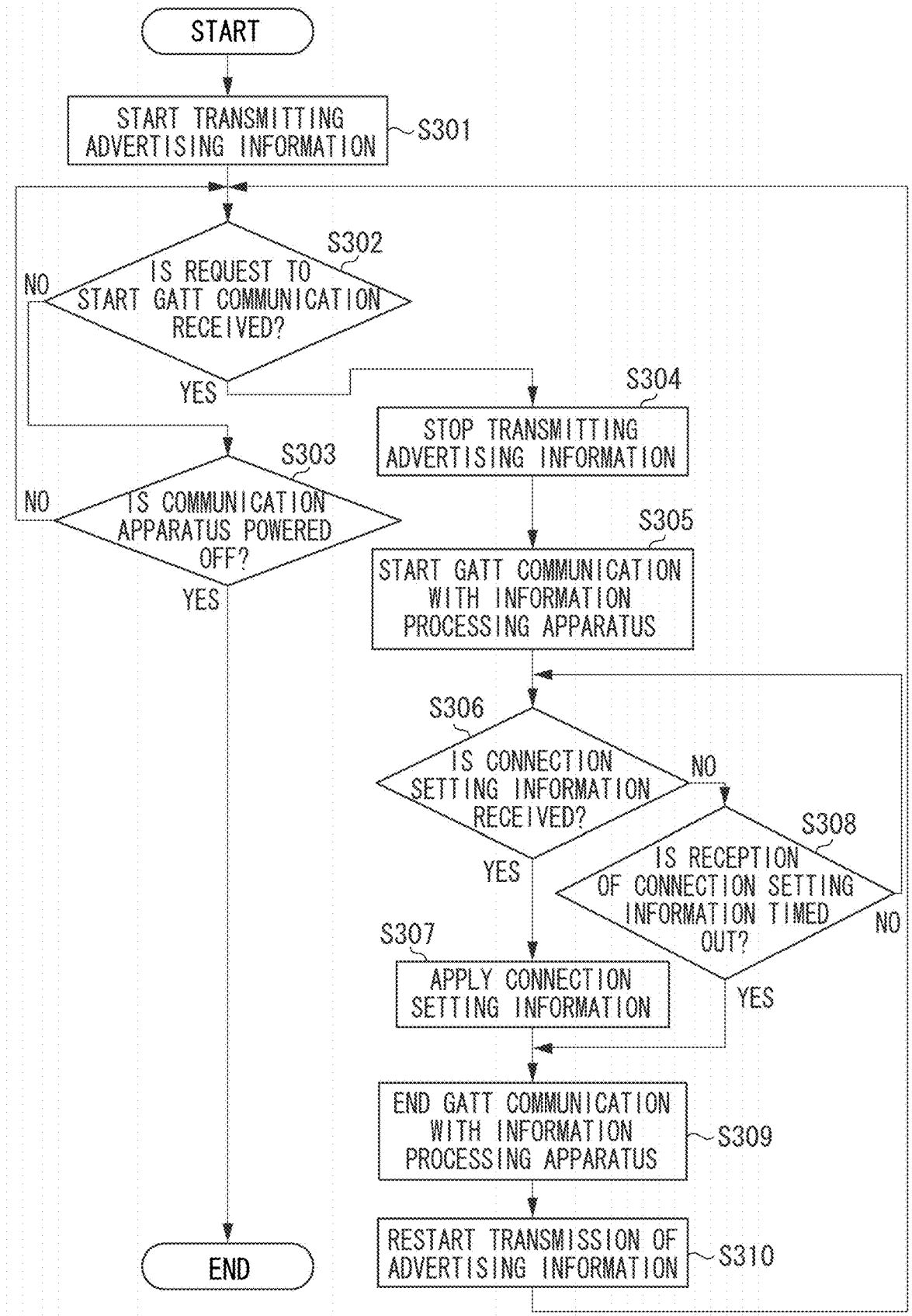
FIG. 3 is a flowchart illustrating processing performed by a communication apparatus according to the first exemplary embodiment.

Next, processing performed by the communication apparatus 151, which is targeted for the connection setting processing illustrated in FIG. 2, will be described with reference to FIG. 3. FIG. 3 is a flowchart illustrating a flow of the processing performed by the communication apparatus 151 when the communication apparatus 151 is subjected to the connection setting processing from the information processing apparatus 101. For example, the CPU 154 reads out the program stored in the ROM 152, an external storage device (not illustrated) provided in the communication apparatus 151, or the like into the RAM 153, and executes the read program, by which the flowchart illustrated in FIG. 3 is realized. Further, assume that the processing illustrated in the flowchart of FIG. 3 is started when the communication apparatus 151 shifts to the connection setting mode with the pairing being completed between the information processing apparatus 101 and the communication apparatus 151.

In step S301, the CPU 154 is brought into the advertising state, which is the state of broadcasting the advertisement information by the short-range wireless communication unit 157 every time a predetermined time period has elapsed. Broadcasting here refers to transmitting information to within a predetermined range without specifying a destination to which the information is transmitted. Further, at this time, the CPU 154 broadcasts the advertisement information with a predetermined strength to limit a range where the advertisement information is reachable. Now, the Bluetooth® Low Energy standard is a technique for transmitting information small in size to neighboring wireless devices, and a maximum distance to which the information is reachable is a range of approximately 30 to 100 m substantially centered at the communication apparatus 151. Therefore, if the communication apparatus 151 does not limit the strength of radio waves when transmitting the advertisement information, the information processing apparatus 101 may wastefully detect not only the advertisement information of a communication apparatus located close thereto but also the advertisement information of a communication apparatus located away therefrom (a communication apparatus that the user less likely uses). Further, for example, the communication apparatus 151 may unintentionally allow the advertisement information to reach even an information processing apparatus that the communication apparatus 151 does not want to permit to perform the connection setting processing thereon. Therefore, the CPU 154 transmits the advertisement information with the predetermined strength to limit the reachable range, and therefore can permit only a communication information processing apparatus located close to the communication apparatus 151 to detect the advertisement information.

Subsequently, in step S302, the CPU 154 determines whether the request to start the GATT communication is received from the information processing apparatus 101 by the short-range wireless communication unit 157. If the CPU 154 determines that the request to start the GATT communication is received by the short-range wireless communication unit 157 (YES in step S302), the processing proceeds to step S304. On the other hand, if the CPU 154 determines that the request to start the GATT communication is not received by the short-range wireless communication unit 157 (NO in step S302), the processing proceeds to step S303. In step S303, the CPU 154 determines whether the communication apparatus 151 is about to be powered off. More specifically, at this time, the CPU 154 determines whether a power source button provided on the communication apparatus 151 is pressed and an instruction to start processing for powering off the communication apparatus 151 is issued. If the CPU 154 determines that the communication apparatus 151 is not about to be powered off (NO in step S303), the processing proceeds to step S302 again. On the other hand, if the CPU 154 determines that the communication apparatus 151 is about to be powered off (YES in step S303), the CPU 154 stops the advertisement and ends the processing. In step S303, the CPU 154 may determine whether an instruction to end the connection setting mode is received, and stop the advertisement and end the processing if the instruction to end the connection setting mode is received.

In step S304, the CPU 154 temporarily stops transmitting the advertisement information to carry out the GATT communication.

Subsequently, in step S305, the CPU 154 starts the GATT communication with the information processing apparatus 101 by the short-range wireless communication unit 157. At this time, the CPU 154 does not limit the range in which radio waves can reach when carrying out the GATT communication, unlike when transmitting the advertisement information. Therefore, a communicable range by the GATT communication exceeds the range in which the advertisement information can reach. This is because the GATT communication is started only with an information processing apparatus capable of accessing inside the range where the advertisement information can reach and from which the communication apparatus 151 can permit itself to be subjected to the connection setting processing, whereby a state where the GATT communication has been started means a state where security is ensured. This expansion of the communicable range allows the information processing apparatus 101, which has started the connection setting processing by moving closer to the communication apparatus 151 and receiving the advertisement information, to continue the connection setting processing even when moving away from the communication apparatus 151, as long as the information processing apparatus 101 stays in the range in which radio waves can be reached.

Subsequently, in step S306, the CPU 154 determines whether the connection setting information for registering the access point 131 that is the connection destination of the communication apparatus 151 (e.g., the command for setting the infrastructure connection mode) is received via the GATT communication. If the CPU 154 determines that the connection setting information is received (YES in step S306), the processing proceeds to step S307. On the other hand, if the CPU 154 determines that the connection setting information is not received (NO in step S306), the processing proceeds to step S308. In step S308, the CPU 154 determines whether a predetermined time period has elapsed from the start of the GATT communication (whether the reception of the connection setting information is timed out). If the CPU 154 determines that the reception of the connection setting information is not timed out (NO in step S308), the processing proceeds to step S306 again. On the other hand, if the CPU 154 determines that the reception of the connection setting information is timed out (YES in step S308), the processing proceeds to step S309.

In step S307, the CPU 154 applies the command for setting the infrastructure connection mode that is contained in the received connection setting information, and shifts to the infrastructure connection mode. At this time, the CPU 154 performs processing for registering the access point indicated by the SSID stored in the connection setting information (the access point 131 in the present example) as the connection destination of the communication apparatus 151. More specifically, the CPU 154 sets the access point 131 into the RAM 153 as the access point to be used for the infrastructure connection via the communication unit 156. Further, the CPU 154 registers the password required to use the access point 131. At this time, the CPU 154 may, for example, attempt a connection to the specified access point 131, and notify the information processing apparatus 101 of a result thereof by the GATT communication. Further, the information processing apparatus 101 may be configured to restart the connection setting processing if being notified that the attempt for the connection to the access point 131 has failed from the communication apparatus 151. Upon appropriately ending the registration of the access point 131, the CPU 154 connects to the access point 131 via the communication unit 156, and is set into a state communicable by the wireless LAN (Wi-Fi®). As a result, the infrastructure connection is established between the information processing apparatus 101 and the communication apparatus 151 via the access point 131. Subsequently, in step S309, the CPU 154 ends the GATT communication between the information processing apparatus 101 and the communication apparatus 151. Then, in step S310, the CPU 154 restarts the transmission of the advertisement information.

In this manner, the communication apparatus 151 according to the present exemplary embodiment transmits the advertisement information with the predetermined strength to limit the reachable range. By being configured in this manner, the communication apparatus 151 can allow the information processing apparatus 101 to detect only a communication apparatus located close to the information processing apparatus 101 and having a high possibility that the user uses it as the target for the connection setting processing, thereby improving the convenience for the user. Further, this configuration can prevent or make less likely an arrival of the advertisement information at an information processing apparatus located away from the communication apparatus 151 and unsuitable for the communication apparatus 151 to be subjected to the connection setting processing therefrom, thereby enhancing the security of the communication apparatus 151. Further, the communication apparatus 151 is configured not to limit the range in which radio waves can be reached when the information processing apparatus 101 and the communication apparatus 151 carry out the GATT communication therebetween, which allows the communication to be maintained even when a distance between the apparatuses is changed.

Further, in the present exemplary embodiment, the communication apparatus 151 is configured to continue transmitting the advertisement information every time the predetermined time period has elapsed as long as the communication apparatus 151 is powered on, but is not limited to this configuration. More specifically, the communication apparatus 151 may be configured to include a button or the like usable for the user to issue an instruction to start transmitting the advertisement information, and also be configured to set a time-out to a time period during which the request to start the GATT communication can be received. By being configured in this manner, the communication apparatus 151 can limit a time period during which the communication apparatus 151 can be subjected to the connection setting processing to only within a predetermined time period, thereby saving the power consumption of the communication apparatus 151.

The first exemplary embodiment has been described as the example in which the information processing apparatus 101 registers the access point 131 that is the connection destination of the communication apparatus 151 into the communication apparatus 151.

For example, when the information processing apparatus 101 carries out the communication such as the transmission of the print job to the communication apparatus 151 connected as the infrastructure connection, the communication apparatus 151 should be registered in the information processing apparatus 101 as the communication destination. This is because, for example, if a plurality of communication apparatuses is connected to the access point 131 used for the infrastructure connection, the information processing apparatus 101 have to identify the communication apparatus 151 with which the information processing apparatus 101 attempts to communicate (the communication apparatus that is the communication destination). For example, a name and the identification information of the communication apparatus 151 registered as the communication destination are displayed on a communication destination selection button 404 on the startup screen 400 of the print application as illustrated in FIG. 4. Then, the information processing apparatus 101 can communicate with the communication apparatus 151 displayed on the communication destination selection button 404.

Therefore, a second exemplary embodiment will be described as an example in which the information processing apparatus 101 registers the communication apparatus 151 targeted for the connection setting processing as the communication destination when the connection setting processing is performed.

FIG. 6 is a flowchart illustrating a flow of connection setting processing performed by the information processing apparatus 101 according to the present exemplary embodiment. For example, the CPU 103 reads out the program stored in the ROM 104, the external storage device 106, or the like into the RAM 105, and executes the read program, by which the flowchart illustrated in FIG. 6 is realized. Further, assume that the processing illustrated in the flowchart of FIG. 6 is started when the printer setup button 403 is pressed with the pairing being completed between the information processing apparatus 101 and the communication apparatus 151. Further, assume that the communication apparatus 151 has shifted to the connection setting mode at this time.

Processes in steps S601 to S610 are similar to the processes in steps S201 to S210, respectively, whereby descriptions thereof will be omitted here.

In step S611, the CPU 103 acquires network information from the communication apparatus 151 to be targeted for the connection setting processing by the GATT communication established in step S605. The network information stores therein the identification information for detecting the communication apparatus 151 via the access point 131 (e.g., the MAC address of the communication apparatus 151). In the present exemplary embodiment, the communication system is configured in such a manner that the identification information is stored in the network information acquired in step S611, but may be configured in such a manner that the identification information is stored in the advertisement information acquired in step S602. Alternatively, the communication system may be configured in such a manner that the identification information is stored in, for example, response data transmitted from the communication apparatus 151 in response to the request to start the GATT communication that has been transmitted in step S605.

In step S612, the CPU 103 detects the communication apparatus 151 based on the identification information stored in the network information acquired in step S611, and registers the detected communication apparatus 151 as the communication destination of the information processing apparatus 101. More specifically, the CPU 103 broadcasts a request for a response reporting the identification information to communication apparatuses existing in the connected network, to which the information processing apparatus 101 is connected, and detects a communication apparatus that has issued a response corresponding to the identification information acquired in step S611. In the present exemplary embodiment, the information processing apparatus 101 is connected to the access point 131, and therefore broadcasts the request to communication apparatuses connected via the access point 131. Due to the registration of the communication destination, the information processing apparatus 101 can start the communication with the communication apparatus 151 after that.

In this manner, the information processing apparatus 101 according to the present exemplary embodiment also registers the communication apparatus 151 targeted for the connection setting processing as its own communication destination along with performing the connection setting processing on the communication apparatus 151. Configuring the information processing apparatus 101 in this manner allows the information processing apparatus 101 to omit a user's operation such as detecting and selecting the communication apparatus 151 that becomes the communication destination of the information processing apparatus 101. Therefore, this configuration can simplify processing required to be performed by the user operating the information processing apparatus 101, thereby improving the convenience for the user.

In the above-described exemplary embodiments, the processing has been described in which the infrastructure connection mode is set to the communication apparatus 151 and the infrastructure connection is established between the communication apparatus 151 and the information processing apparatus 101.

However, for example, if there is no external access point, such as a wireless LAN router, around the apparatuses, the infrastructure connection cannot be established between the apparatuses. In such a case, the communication apparatus 151 and the information processing apparatus 101 can achieve the communication between the apparatuses even when there is no external access point, such as a wireless LAN router, by communicating with each other by the direct connection.

Therefore, a third exemplary embodiment will be described as an example in which the information processing apparatus 101 determines a network connection status of the information processing apparatus 101, and sets any of the infrastructure connection mode and the direct connection mode when performing the connection setting processing on the communication apparatus 151.

Figure 7B:
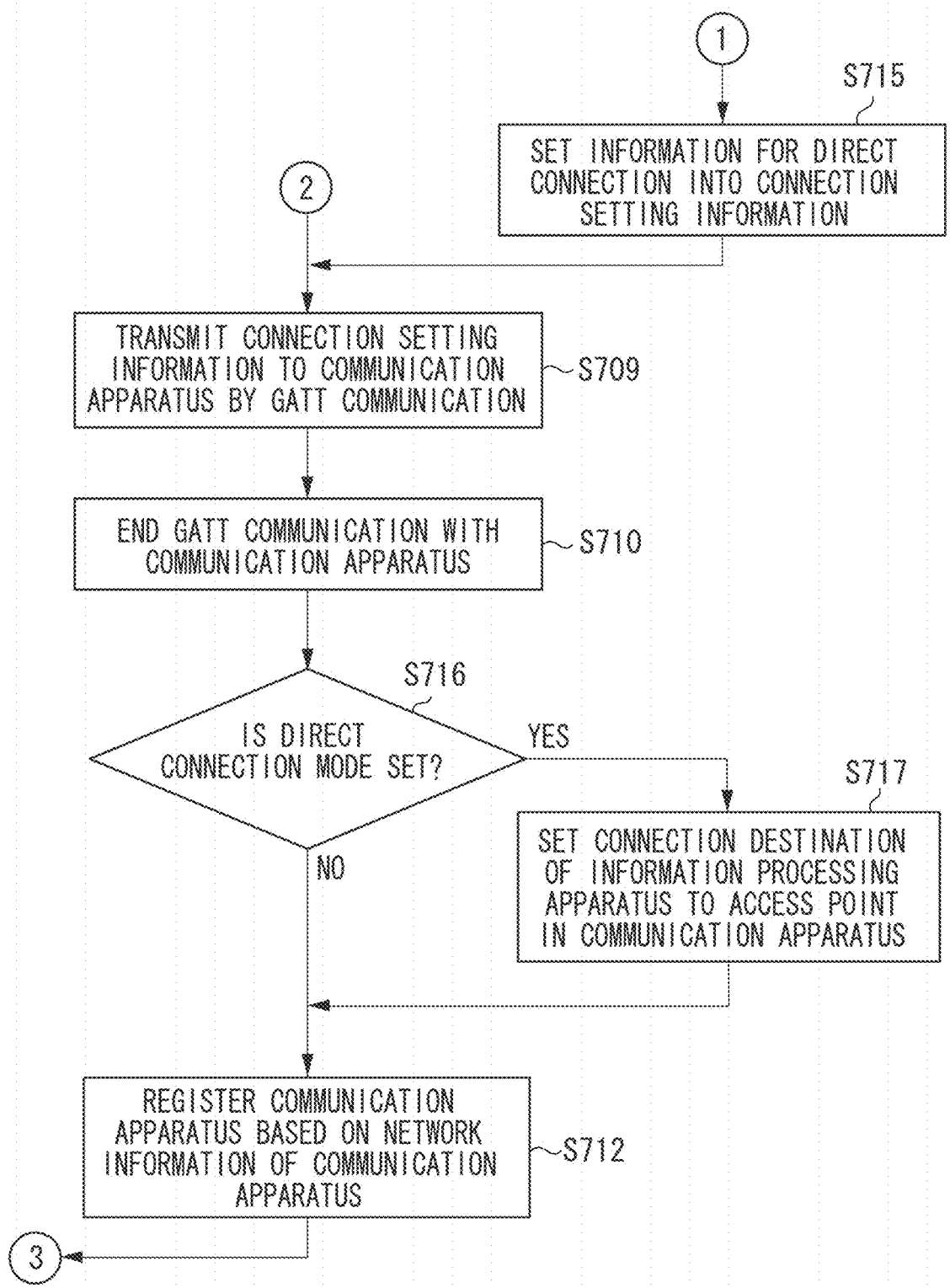
FIG. 7 (including FIGS. 7A and 7B) is a flowchart illustrating processing performed by an information processing apparatus according to a third exemplary embodiment.

FIG. 7 (including FIGS. 7A and 7B) is a flowchart illustrating a flow of connection setting processing performed by the information processing apparatus 101 according to the present exemplary embodiment. For example, the CPU 103 reads out the program stored in the ROM 104, the external storage device 106, or the like into the RAM 105, and executes the read program, by which the flowchart illustrated in FIG. 7 is realized. Further, assume that the processing illustrated in the flowchart of FIG. 7 is started when the printer setup button 403 is pressed with the pairing completed between the information processing apparatus 101 and the communication apparatus 151. Further, assume that the communication apparatus 151 has shifted to the connection setting mode at this time.

Processes in steps S701 to S710 are similar to the processes in steps S201 to S210, respectively, and processes in steps S711 and S712 are similar to the processes in steps S611 and S612, respectively. Therefore, descriptions thereof will be omitted here.

In step S711, the information processing apparatus 101 acquires the network information from the communication apparatus 151, and, in the present example, assume that the network information stores therein not only the above-described identification information but also direct connection information for directly connecting to the communication apparatus 151. More specifically, the direct connection information is, for example, an SSID of the access point for the direct connection that is prepared in the communication apparatus 151, and a password for connecting to this access point.

In step S713, the CPU 103 checks the network connection status of the information processing apparatus 101, and determines whether to set the direct connection mode to the communication apparatus 151. More specifically, first, in step S706, the CPU 103 determines whether the SSID of an access point to which the communication unit 111 is connected can be acquired from the OS installed in the information processing apparatus 101. In step S706, if the communication unit 111 is connected to an access point, the CPU 103 can acquire the SSID name of this access point from the OS. On the other hand, if the communication unit 111 is not connected to an access point, the CPU 103 acquires information indicating that the communication unit 111 is not connected to an access point from the OS. Therefore, the CPU 103 can determine whether the communication unit 111 is connected to an access point based on the information acquired from the OS.

Then, if the communication unit 111 is connected to the network via an access point, it is desirable that the communication apparatus 151 also connects to a similar access point, and the infrastructure connection is established between the apparatuses. This is because, normally, the Internet communication by the wireless LAN is possible in the infrastructure connection while the Internet communication by the wireless LAN is impossible in the direction connection. On the other hand, if the communication unit 111 is not connected to an access point, it is highly possible that there is no external access point around the apparatus, whereby it is desirable to establish the direct connection between the apparatuses. Therefore, if being able to acquire the SSID name of an access point from the OS, the CPU 103 determines to set the infrastructure connection mode to the communication apparatus 151 (NO in step S713), and then the processing proceeds to step S707. On the other hand, if being unable to acquire the SSID name of an access point from the OS, the CPU 103 determines to set the direct connection mode to the communication apparatus 151 (YES in step S713), and then the processing proceeds to step S715.

In step S714, the CPU 103 stores information for setting the infrastructure connection mode to the communication apparatus 151, into the connection setting information that will be transmitted in step S709. More specifically, the CPU 103 stores the SSID and the password of the access point to which the communication unit 111 is currently connected, the command for setting the infrastructure connection mode to the communication apparatus 151 (for causing the communication apparatus 151 to connect to the access point to which the communication unit 111 is currently connected), and the like.

In step S715, the CPU 103 stores information for setting the direct connection mode to the communication apparatus 151, into the connection setting information that will be transmitted in step S709. More specifically, the CPU 103 stores a command for setting the direct connection mode to the communication apparatus 151 (for enabling the access point in the communication apparatus 151), and the like.

In step S709, the CPU 103 transmits the connection setting information set in step S714 or S715 to the communication apparatus 151 by the GATT communication. As a result, any of the infrastructure connection mode and the direct connection mode is set to the communication apparatus 151 according to the content stored in the connection setting information. More specifically, at this time, the processing described in the description of step S307 is performed if the infrastructure connection mode is set, and the access point in the communication apparatus 151 is set to be enabled if the direct connection mode is set.

In step S716, the CPU 103 determines whether the direct connection mode is set to the communication apparatus 151. If the CPU 103 determines that the direct connection mode is not set (i.e., the infrastructure connection mode is set) (NO in step S716), the processing proceeds to step S712. On the other hand, if the CPU 103 determines that the direct connection mode is set to the communication apparatus 151 (YES in step S716), the processing proceeds to step S717.

In step S717, the CPU 103 sets the access point in the communication apparatus 151 as the connection destination of the information processing apparatus 101 based on the SSID and the password of the access point in the communication apparatus 151, stored in the network information acquired in step S711. This connection is carried out via the communication unit 111 by the wireless LAN communication method. This connection allows the information processing apparatus 101 and the communication apparatus 151 to connect to each other as a peer-to-peer connection, and thus allows the communication to be realized between the apparatuses even under an environment that no external access point exists around the information processing apparatus 101 and the communication apparatus 151. After the CPU 103 completes the registration of the communication destination of the information processing apparatus 101, the processing proceeds to step S712.

In this manner, the information processing apparatus 101 according to the present exemplary embodiment can set, to the communication apparatus 151, one of the infrastructure connection mode and the direct connection mode that is suitable for the network connection status of the information processing apparatus 101. Therefore, the appropriate connection mode is automatically set without requiring the user using the information processing apparatus 101 to be aware of the network connection status of the information processing apparatus 101, which can simplify the processing required to be performed by the user operating the information processing apparatus 101, thereby improving the convenience for the user.

In the present exemplary embodiment, the direct connection is assumed to be the connection in which the information processing apparatus 101 connects to the access point in the communication apparatus 151, but is not limited thereto and may be any connection as long as the information processing apparatus 101 and the communication apparatus 151 connect to each other as the peer-to-peer connection. In other words, the information processing apparatus 101 may connect as the peer-to-peer connection without the intervention of the access point in the communication apparatus 151, by employing, for example, a wireless local area network (WLAN) connection in an ad hoc mode or a connection by Bluetooth®. Alternatively, Wi-Fi Direct® or the like may be used as the communication method for the direct connection.

In the above-described exemplary embodiments, the information processing apparatus 101 establishes the infrastructure connection by presenting the information about the access point 131 to which the communication unit 111 is connected to the communication apparatus 151. However, for example, the access point 131 to which the communication unit 111 is connected may be located outside the communicable range of the communication apparatus 151, or may be an access point designed for communication using a frequency unsupported by the communication apparatus 151. In such a case, the information processing apparatus 101 cannot establish the infrastructure connection with the communication apparatus 151. Therefore, a fourth exemplary embodiment will be described as a communication capable of more reliably establishing the infrastructure connection.

FIG. 11 is a flowchart illustrating a flow of connection setting processing performed by the information processing apparatus 101 according to the present exemplary embodiment. For example, the CPU 103 reads out the program stored in the ROM 104, the external storage device 106, or the like into the RAM 105, and executes the read program, by which the flowchart illustrated in FIG. 11 is realized. Further, assume that the processing illustrated in the flowchart of FIG. 11 is started when the printer setup button 403 is pressed with the pairing being completed between the information processing apparatus 101 and the communication apparatus 151. Further, assume that the communication apparatus 151 has shifted to the connection setting mode at this time.

Processes in steps S1101 to S1112 are similar to the processes in steps S601 to S612, respectively, and therefore descriptions thereof will be omitted here.

In step S1113, the CPU 103 acquires a list of access points to which the communication unit 156 can connect (information indicating a list) from the communication apparatus 151 by the GATT communication established in step S1105 (list acquisition).

In step S1114, the CPU 103 determines whether there is the access point 131 to which the communication unit 111 is connected that has been acquired in step S1106 in the list of access points to which the communication unit 156 can connect that has been acquired in step S1113. If the CPU 103 determines that there is the access point 131 to which the communication unit 111 is connected (YES in step S1114), the processing proceeds to step S1107. In step S1107, the CPU 103 transmits the information about the access point 131 to which the communication unit 111 is connected to the communication apparatus 151. On the other hand, if the CPU 103 determines that there is not the access point 131 to which the communication unit 111 is connected (NO in step S1114), the processing proceeds to step S1115.

In step S1115, the CPU 103 displays the list of access points to which the communication unit 156 can connect that has been acquired from the communication apparatus 151 in step S1113 on the display unit 108, and receives a selection of any one of access points in the list from the user.

In step S1116, the CPU 103 displays the SSID of the access point selected in step S1115, and displays a screen for inputting a password for using the access point corresponding to this SSID on the display unit 108. At this time, for example, the screen 500 illustrated in FIG. 5 is displayed as the screen for inputting the password.

In step S1117, the information processing apparatus 101 receives an input of the password for using the access point selected in step S1115, from the user. At this time, the CPU 103 acquires the password information input by the user onto the input unit 501.

In step S1118, the CPU 103 transmits the connection setting information for registering the access point selected in step S1115 as the connection destination of the communication apparatus 151 to the communication apparatus 151 by the GATT communication.

In step S1119, the GATT communication between the communication apparatus 151 and the information processing apparatus 101 is ended.

In step S1120, the CPU 103 switches the connection destination of the communication unit 111 to the access point selected in step S1115.

In step S1121, the CPU 103 detects the communication apparatus 151 based on the identification information stored in the network information acquired in step S1111, and registers the detected communication apparatus 151 as the communication destination of the information processing apparatus 101.

In step S1107, the CPU 103 may display the SSID acquired from the OS in step S1106, and display a screen for confirming to the user whether to use the access point 131 corresponding to this SSID, on the display unit 108. Then, the CPU 103 may display the screen for inputting the password on the display unit 108, if an intention to use the access point 131 corresponding to this SSID is input onto this confirmation screen. On the other hand, the processing may proceed to step S1115 and the CPU 103 may set the connection with use of an access point selected by the user, if the intention to use the access point 131 corresponding to this SSID is not input onto this confirmation screen.

Figure 12:
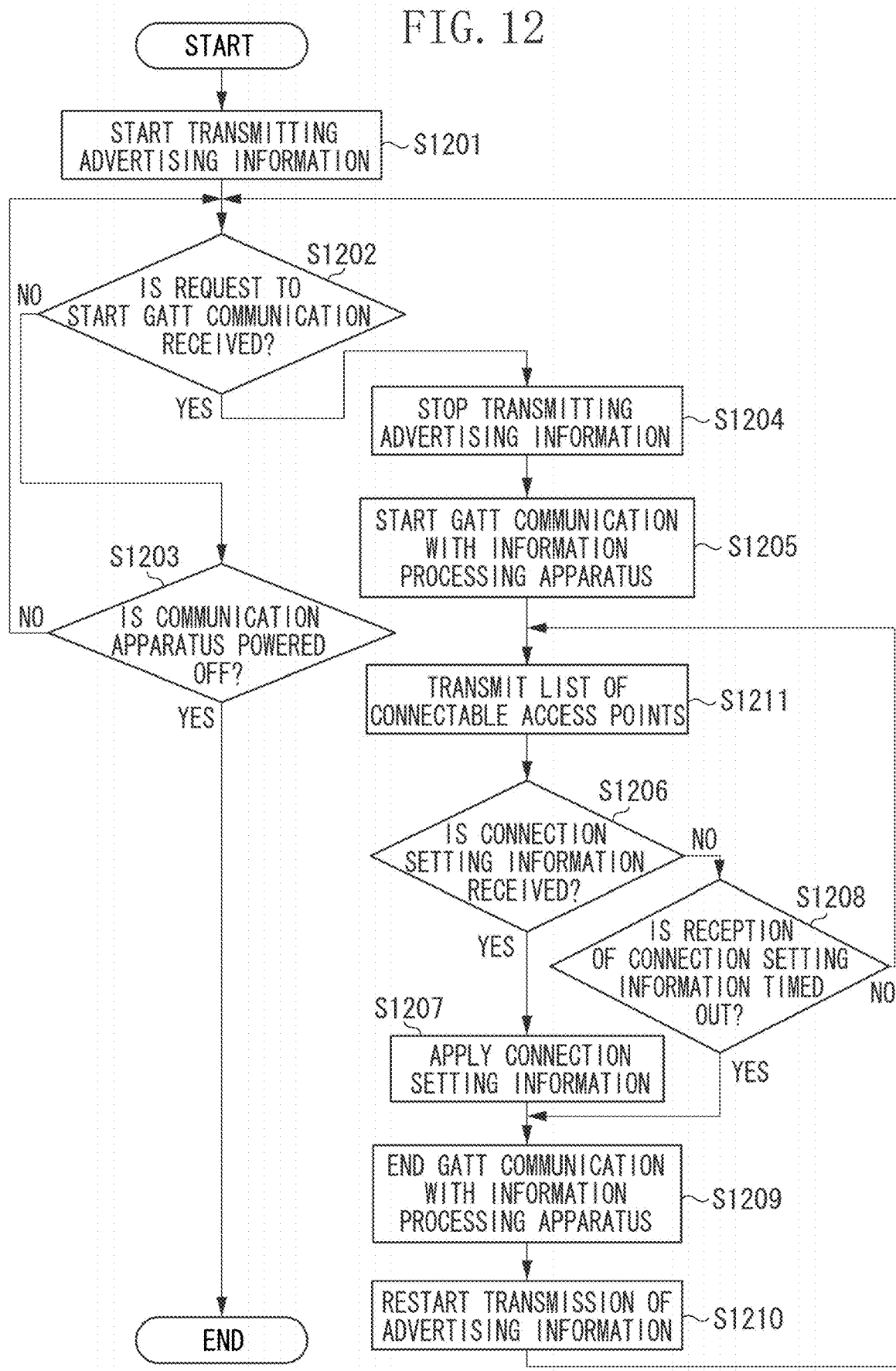
FIG. 12 is a flowchart illustrating processing performed by a communication apparatus according to the fourth exemplary embodiment.

Next, processing performed by the communication apparatus 151, which is targeted for the connection setting processing illustrated in FIG. 11, will be described with reference to FIG. 12. FIG. 12 is a flowchart illustrating a flow of the processing performed by the communication apparatus 151 when the communication apparatus 151 is subjected to the connection setting processing from the information processing apparatus 101. For example, the CPU 154 reads out the program stored in the ROM 152, the external storage device (not illustrated) provided in the communication apparatus 151, or the like into the RAM 153, and executes the read program, by which the flowchart illustrated in FIG. 12 is realized. Further, assume that the processing illustrated in the flowchart of FIG. 12 is started when the communication apparatus 151 shifts to the connection setting mode with the pairing being completed between the information processing apparatus 101 and the communication apparatus 151.

Processes in steps S1201 to S1210 are similar to the processes in steps S301 to S310, respectively, and therefore descriptions thereof will be omitted here.

In step S1211, the CPU 154 transmits the list of access points to which the communication unit 156 can connect, to the information processing apparatus 101 by the GATT communication established in step S1205. The list of access points to which the communication unit 156 can connect can be acquired by inquiring of the OS in the communication apparatus 151.

In this manner, in the present exemplary embodiment, the information processing apparatus 101 causes the user to select the access point from the list if there is not the access point 131 to which the communication unit 111 is connected in the list of access points to which the communication unit 156 can connect. Then, the infrastructure connection is established with use of the selected access point. In the present exemplary embodiment, configuring the information processing apparatus 101 in this manner can prevent an access point to which the communication apparatus 151 cannot connect from being unintentionally used for the infrastructure connection, thereby further reliably establishing the infrastructure connection. However, the present exemplary embodiment is not limited to this configuration. For example, the CPU 103 may set the direct setting mode to the communication apparatus 151 if there is not the access point 131 to which the communication unit 111 is connected in the list of access points to which the communication unit 156 can connect. Alternatively, the processing may be switched in response to a trigger of the connection setting processing. In this case, in a case where the trigger of the connection setting processing is the reception of the instruction to set the infrastructure connection mode from the user, the CPU 103 sets the infrastructure connection mode even if there is not the access point 131 to which the communication unit 111 is connected in the list. On the other hand, in a case where the trigger of the connection setting processing is the automatic setting instruction that sets the connection mode according to the connection state of the information processing apparatus 101, the CPU 103 sets the direct connection mode if there is not the access point 131 to which the communication unit 111 is connected in the list.

In the fourth exemplary embodiment, the information processing apparatus 101 acquires the list of access points, to which the communication unit 156 can connect, which is held in the communication apparatus 151. However, for example, if the acquired list is old information, some access points included in the list may be already powered off at a timing when the information processing apparatus 101 performs the connection setting processing. In such a case, for example, the CPU 103 may be unable to correctly determine whether there is the access point 131 to which the communication unit 111 is connected in the list of access points to which the communication unit 156 can connect. Therefore, a fifth exemplary embodiment will be described as a communication system capable of further reliably establishing the infrastructure connection.

Figure 13B:
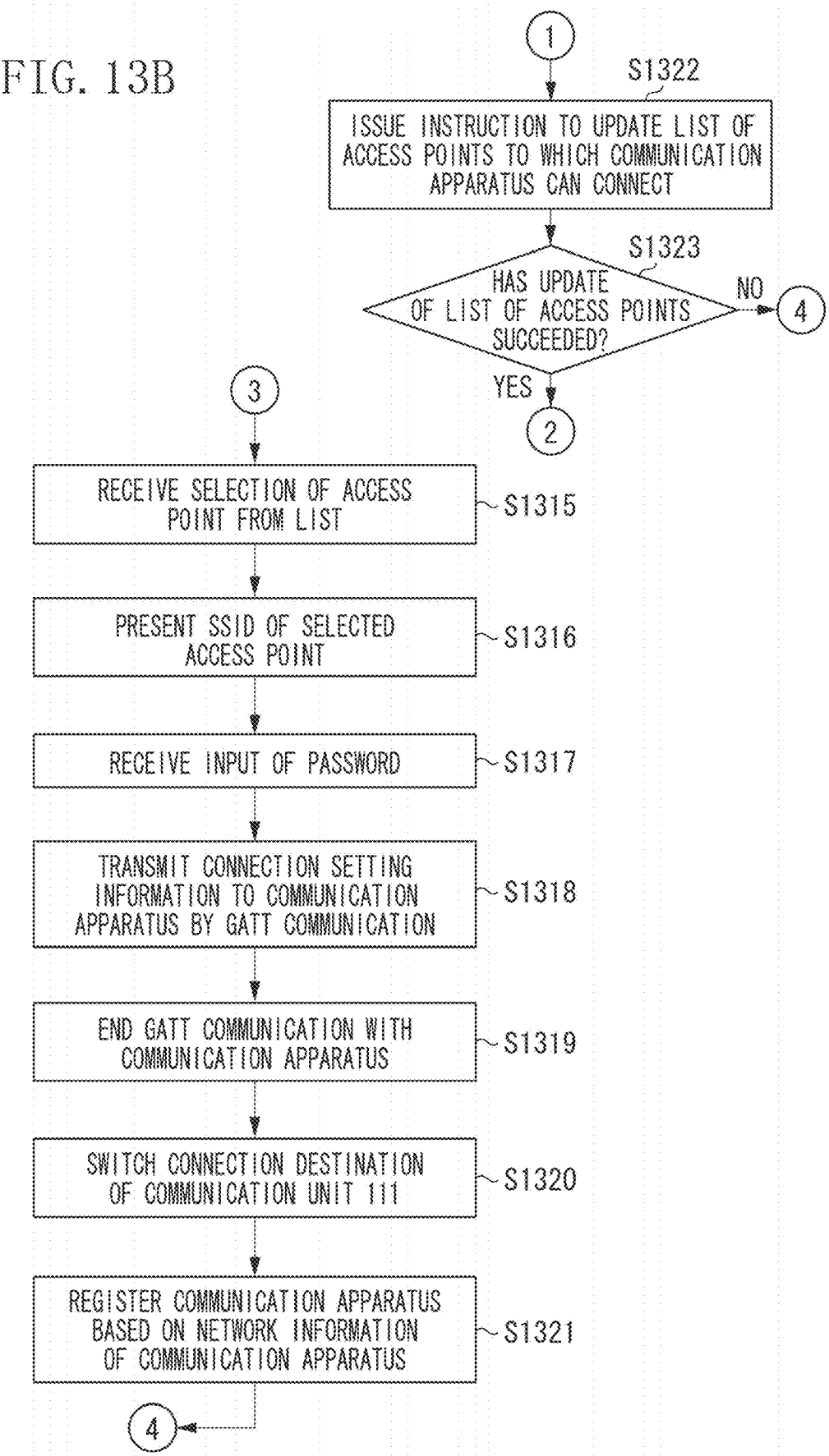
FIG. 13 (including FIGS. 13A and 13B) is a flowchart illustrating processing performed by an information processing apparatus according to a fifth exemplary embodiment.

FIG. 13 is a flowchart illustrating a flow of connection setting processing performed by the information processing apparatus 101 according to the present exemplary embodiment. For example, the CPU 103 reads out the program stored in the ROM 104, the external storage device 106, or the like into the RAM 105, and executes the read program, by which the flowchart illustrated in FIG. 13 is realized. Further, assume that the processing illustrated in the flowchart of FIG. 13 is started when the printer setup button 403 is pressed with the pairing being completed between the information processing apparatus 101 and the communication apparatus 151. Further, assume that the communication apparatus 151 has shifted to the connection setting mode at this time. Processes in steps S1301 to S1321 are similar to the processes in steps S1101 to S1121, respectively, and therefore descriptions thereof will be omitted here.

In step S1322, the CPU 103 establishes the Bluetooth® Low Energy connection based on the received advertisement information, and requests the list of external access points to which the communication unit 156 can connect, to the communication apparatus 151 by the GATT communication via the short-range wireless communication unit 112. The list requested at this time is a list of pieces of information for identifying the external access points to which the communication unit 156 can connect, and the information for identifying the external access point is, for example, the SSID.

Now, a content of the process in step S1322 will be described with reference to FIG. 14.

FIG. 14 is a flowchart illustrating a flow of the process in step S1322. For example, the CPU 103 reads out the program stored in the ROM 104, the external storage device 106, or the like into the RAM 105, and executes the read program, by which the flowchart illustrated in FIG. 14 is realized.

In step S1401, the CPU 103 transmits a request to start the GATT communication to the communication apparatus 151 based on the received advertisement information. When the request to start the GATT communication is received by the communication apparatus 151, the GATT communication is started between the communication apparatus 151 and the information processing apparatus 101 by this reception.

In step S1402, the CPU 103 transmits an instruction to update the list of external access points to which the communication unit 156 can connect, to the communication apparatus 151 by the GATT communication via the short-range wireless communication unit 112 (instruction transmission). Subsequently, in step S1403, the CPU 103 ends (disconnects) the Bluetooth® Low Energy connection between the communication apparatus 151 and the information processing apparatus 101, thereby ending the GATT communication. When the Bluetooth® Low Energy connection between the communication apparatus 151 and the information processing apparatus 101 is ended, the short-range wireless communication unit 112 is brought into the scanning state, which is the state capable of receiving the advertisement information.

If the update of the list of external access points to which the communication unit 156 can connect has succeeded (is completed) in the communication apparatus 151, advertisement information (a signal) indicating this success is transmitted from the short-range wireless communication unit 157. Therefore, in step S1404, the CPU 103 determines whether the advertisement information (the signal) indicating that the update of the list of external access points to which the communication unit 156 can connect has succeeded (is completed) is received (whether the signal is received) by the short-range wireless communication unit 112. More specifically, the CPU 103 determines whether the advertisement information is received by the short-range wireless communication unit 112, and whether the received advertisement information contains the identification information indicating the communication apparatus 151 and the information indicating that the update of the list has succeeded. If the CPU 103 determines that the advertisement information indicating that the update of the list of external access points to which the communication unit 156 can connect has succeeded is received by the short-range wireless communication unit 112 (YES in step 1404), the processing proceeds to step S1406. On the other hand, if the CPU 103 determines that the advertisement information indicating that the update of the list of external access points to which the communication unit 156 can connect has succeeded is not received by the short-range wireless communication unit 112 (NO in step 1404), the processing proceeds to step S1405. In step S1405, the CPU 103 determines whether a predetermined time period has elapsed from the transmission of the instruction to update the list of access points (whether this update instruction is timed out). If the CPU 103 determines that the update instruction is not timed out (NO in step S1405), the processing proceeds to step S1404 again. On the other hand, if the CPU 103 determines that the update instruction is timed out (YES in step S1405), the processing proceeds to step S1407, and then the processing is ended. At this time, the CPU 103 may display a screen on the display unit 108 for notifying the user that the update instruction is timed out.

In step S1406, the CPU 103 stores, into the RAM 105, determination information indicating that the update of the list of external access points to which the communication unit 156 can connect has succeeded. On the other hand, in step S1407, the CPU 103 stores, into the RAM 105, determination information indicating that the update of the list of external access points to which the communication unit 156 can connect has failed. These pieces of determination information are used in determination processing, which will be described below.

Subsequently, the processing returns to the flowchart illustrated in FIG. 13. In step S1323, the CPU 103 determines whether the request for the list of external access points to which the communication unit 156 can connect has succeeded. At this time, the CPU 103 makes the determination by reading out the determination information held in the RAM 105 in step S1322. If the CPU 103 determines that the update has succeeded (YES in step S1323), the processing proceeds to step 1305. At this time, the Bluetooth® Low Energy connection has been ended (disconnected) between the communication apparatus 151 and the information processing apparatus 101, which means that the CPU 103 reestablishes the Bluetooth® Low Energy connection in step S1305 (reestablishment). On the other hand, if the CPU 103 determines that the update has failed (NO in step S1323), the processing is ended.

In step S1324, the CPU 103 transmits the instruction to start the connection setting to the communication apparatus 151 by the GATT communication started in step S1305.

Next, processing performed by the communication apparatus 151, which is targeted for the connection setting processing illustrated in FIG. 13, will be described with reference to FIG. 15. FIG. 15 is a flowchart illustrating a flow of the processing performed by the communication apparatus 151 when the communication apparatus 151 is subjected to the connection setting processing from the information processing apparatus 101. For example, the CPU 154 reads out the program stored in the ROM 152, the external storage device (not illustrated) provided in the communication apparatus 151, or the like into the RAM 153, and executes the read program, by which the flowchart illustrated in FIG. 15 is realized. Further, assume that the processing illustrated in the flowchart of FIG. 15 is started when the communication apparatus 151 shifts to the connection setting mode with the pairing completed between the information processing apparatus 101 and the communication apparatus 151. Processes in steps S1501 to S1511 are similar to the processes in steps S1201 to S1211, respectively, and therefore descriptions thereof will be omitted here.

In step S1512, the CPU 154 determines the content of the instruction received from the information processing apparatus 101 by the GATT communication started in step S1505. In the present example, assume that the CPU 154 determines whether the received instruction is any of the instruction to update the list of access points and the instruction to start the connection setting. If the CPU 154 determines that the instruction to start connection setting is received (YES in step S1512), the processing proceeds to step S1511. On the other hand, if the CPU 154 determines that the instruction to update the list of access points is received (NO in step S1512), the processing proceeds to step S1513. In step S1513, the CPU 154 ends the Bluetooth® Low Energy connection between the communication apparatus 151 and the information processing apparatus 101, thereby ending the GATT communication. When the Bluetooth® Low Energy connection between the communication apparatus 151 and the information processing apparatus 101 is ended, the short-range wireless communication unit 157 restarts the advertisement. By this restart, the short-range wireless communication unit 157 can allow an apparatus other than the information processing apparatus 101 to also detect the advertisement information while the list of external access points to which the communication unit 156 can connect is updated. The communication apparatus 151 may be configured to prohibit the Bluetooth® Low Energy connection from being established between the communication apparatus 151 and an apparatus other than the information processing apparatus 101 depending on the advertisement information transmitted at this time so that the communication apparatus 151 does not receive interruption of processing from the apparatus other than the information processing apparatus 101. More specifically, the communication apparatus 151 may enable only the transmission of the advertisement information and disable the reception of the connection request. Alternatively, the communication apparatus 151 may be configured not to restart the advertisement even after the Bluetooth® Low Energy connection is ended between the communication apparatus 151 and the information processing apparatus 101. In this case, the communication apparatus 151 cannot allow an apparatus other than the information processing apparatus 101 to also detect the advertisement information while the list of access points is updated, but can save the power consumption of the short-range wireless communication unit 157.

In step S1514, the CPU 154 detects the access points to which the communication unit 156 can connect. More specifically, at this time, the CPU 154 detects a beacon issued from an access point by the communication unit 156. Upon detecting the beacon, the CPU 154 sequentially stores information that allows the access point to be identified, such as the device name and the SSID of the access point, which is contained in this beacon, into the RAM 153. By operating in this manner, the CPU 154 updates the list of access points to which the communication unit 156 can connect.

In step S1515, the CPU 154 determines whether the update of the list of access points in step S1514 has succeeded. For example, when there is no connectable access point around the communication apparatus 151 and thus no beacon is detected, the CPU 154 determines that the update has failed (NO in step S1515), and then processing proceeds to step S1510. In step S1510, the CPU 154 may restart transmission of advertisement information storing therein the information indicating that the update of the list of external access points to which the communication unit 156 can connect has failed.

On the other hand, if the CPU 154 determines that the update has succeeded (YES in step S1515), the processing proceeds to step S1516. In step S1516, the CPU 154 sets the content of the advertisement information to be transmitted after that, to an update success state. More specifically, the CPU 154 stores information indicating that the update of the list of external access points to which the communication unit 156 can connect has succeeded, into the advertisement information that will be transmitted after that. Then, in step S1510, the CPU 154 restarts the transmission of the advertisement information set to the update success state.

In this manner, in the present exemplary embodiment, the list of access points to which the communication unit 156 can connect can be updated to a latest state at the timing when the information processing apparatus 101 performs the connection setting processing. Configuring the communication system in this manner can prevent or make less likely an addition of an access point to which the communication unit 156 cannot connect, to the list at the timing when the connection setting processing is performed. Therefore, the information processing apparatus 101 can further reliably establish the infrastructure connection with the communication apparatus 151.

In a sixth exemplary embodiment, a configuration will be described in which the information processing apparatus 101 receives a notification regarding a success or a failure in the connection setting from the communication apparatus 151 after transmitting the connection setting information.

Figure 17B:
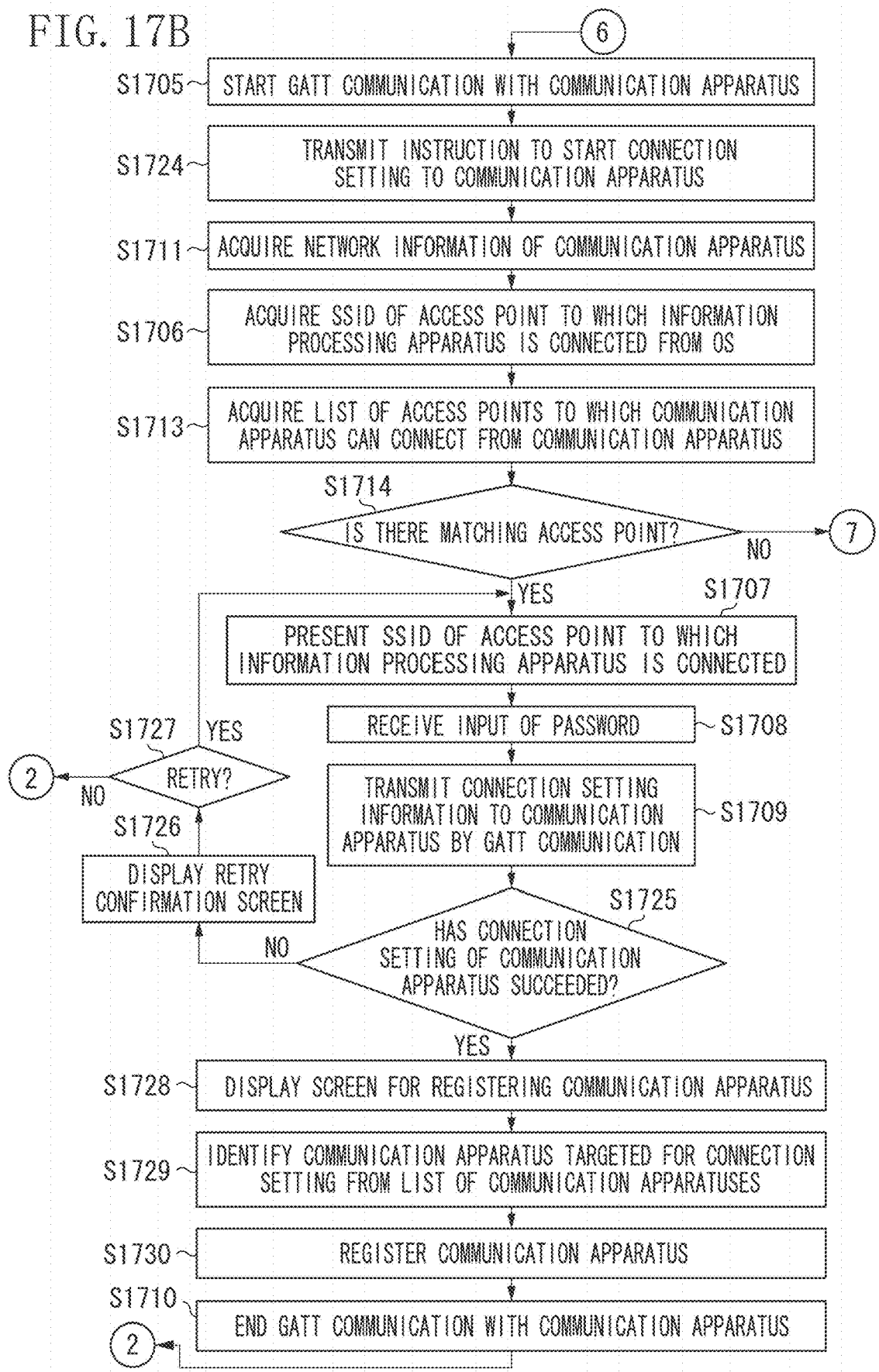
FIG. 17 (including FIGS. 17A, 17B, and 17C) is a flowchart illustrating processing performed by an information processing apparatus according to a sixth exemplary embodiment.
Figure 17C:
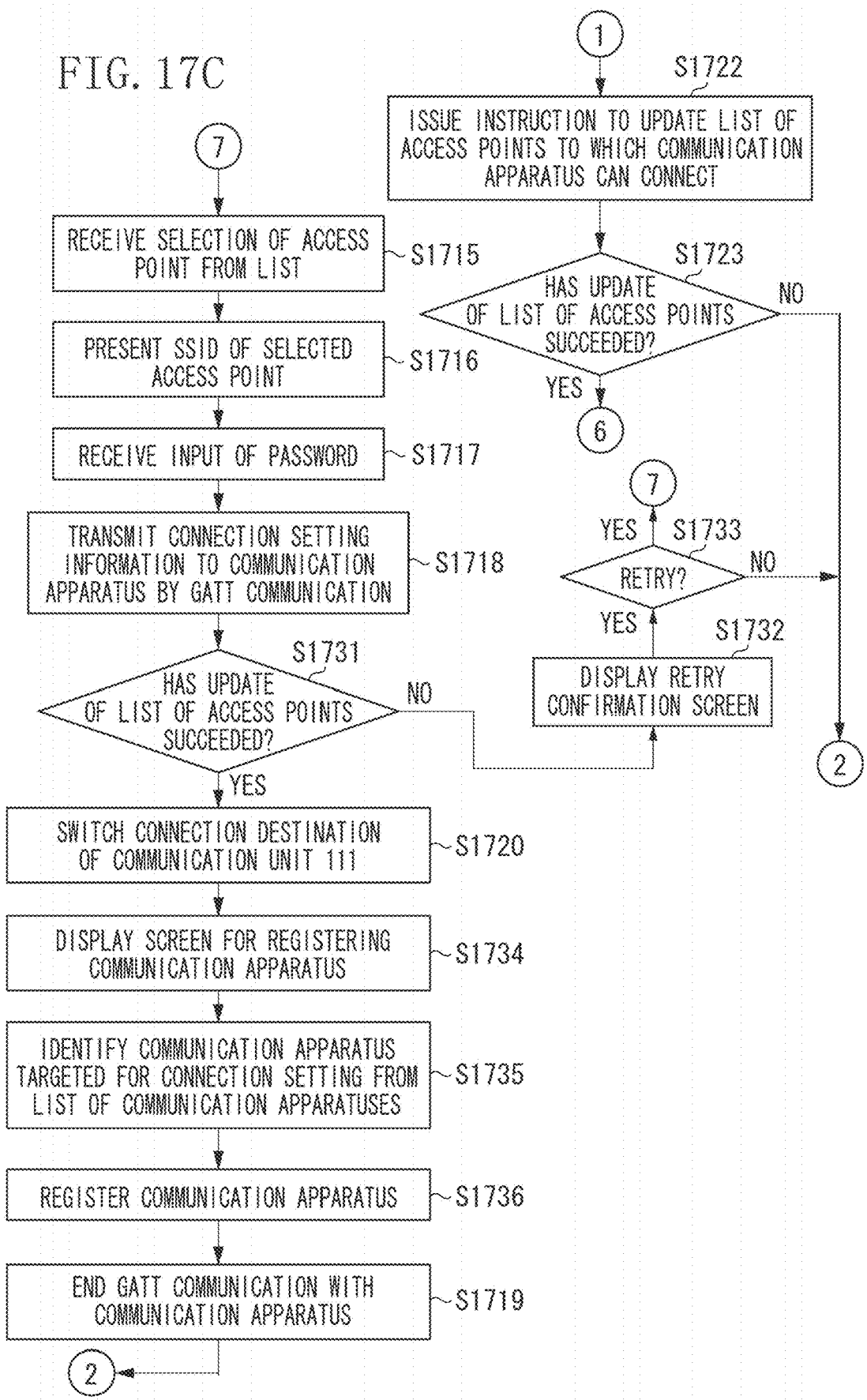

FIG. 17 is a flowchart illustrating a flow of connection setting processing performed by the information processing apparatus 101 according to the present exemplary embodiment. For example, the CPU 103 reads out the program stored in the ROM 104, the external storage device 106, or the like into the RAM 105, and executes the read program, by which the flowchart illustrated in FIG. 17 is realized. Further, assume that the processing illustrated in the flowchart of FIG. 17 is started when the printer setup button 403 is pressed with the pairing completed between the information processing apparatus 101 and the communication apparatus 151. Further, assume that the communication apparatus 151 has shifted to the connection setting mode at this time. Processes in steps S1701 to S1724 are similar to the processes in steps S1301 to S1324, respectively, and therefore descriptions thereof will be omitted here.

After transmitting the connection setting information in step S1709, in step S1725, the CPU 103 determines whether the connection setting of the communication apparatus 151 has succeeded with use of the transmitted connection setting information. More specifically, at this time, the CPU 103 first waits for receiving the notification regarding the success or failure in the connection setting from the communication apparatus 151. Then, if receiving this notification (being notified of the success or the failure), the CPU 103 analyzes the content of this notification, and determines whether the connection setting of the communication apparatus 151 has succeeded.

If the connection setting of the communication apparatus 151 has failed (NO in step S1725), the processing proceeds to step S1726. In step S1726, the CPU 103 displays a screen for confirming, to the user, whether to retry the connection setting of the communication apparatus 151 on the display unit 108. Then, the CPU 103 determines whether to retry the connection setting of the communication apparatus 151 based on a user's input onto this screen. If the CPU 103 determines to retry the connection setting of the communication apparatus 151 (YES in step S1727), the processing proceeds to step S1707. In step S1707, the CPU 103 performs the processes in step S1707 and the steps subsequent thereto again. If the CPU 103 determines not to retry the connection setting of the communication apparatus 151 (NO in step S1727), the processing is ended.

On the other hand, if the connection setting of the communication apparatus 151 has succeeded (YES in step S1725), the processing proceeds to step S1728. In step S1728, the CPU 103 displays a screen for registering any communication apparatus as the communication destination of the information processing apparatus 101 (a registration screen) on the display unit 108. A list of communication apparatuses including a communication apparatus operating as an access point and a communication apparatus connected to the access point 131 to which the information processing apparatus 101 is connected, which are detected by performing a known discovery process, is displayed on the registration screen. When any communication apparatus is selected from the list (the list of registerable communication apparatuses) displayed on the registration screen, the selected communication apparatus is registered as the communication destination of the information processing apparatus 101 by this selection. In the present exemplary embodiment, the communication apparatus 151 targeted for the connection setting is registered as the communication destination of the information processing apparatus 101 without receiving a user's input. Therefore, first, in step S1729, the CPU 103 identifies the communication apparatus 151 targeted for the connection setting from the list of registerable communication apparatuses based on the identification information stored in the network information acquired in step S1711. Then, in step S1730, the CPU 103 registers the identified communication apparatus (the communication apparatus 151 in the present example) as the communication destination of the information processing apparatus 101. Each of the processes in steps S1112, S1121, S1312, and S1321 according to the above-described exemplary embodiments may be realized by the execution of the processes in steps S1728 to S1730.

The processes in steps S1731 to S1736 are similar to steps S1725 to S1730, respectively. After the determination in step S1733, if determining to retry the connection setting, the CPU 103 may perform the processes from step S1715 again, or may perform the processes from step S1716 again.

Figure 18B:
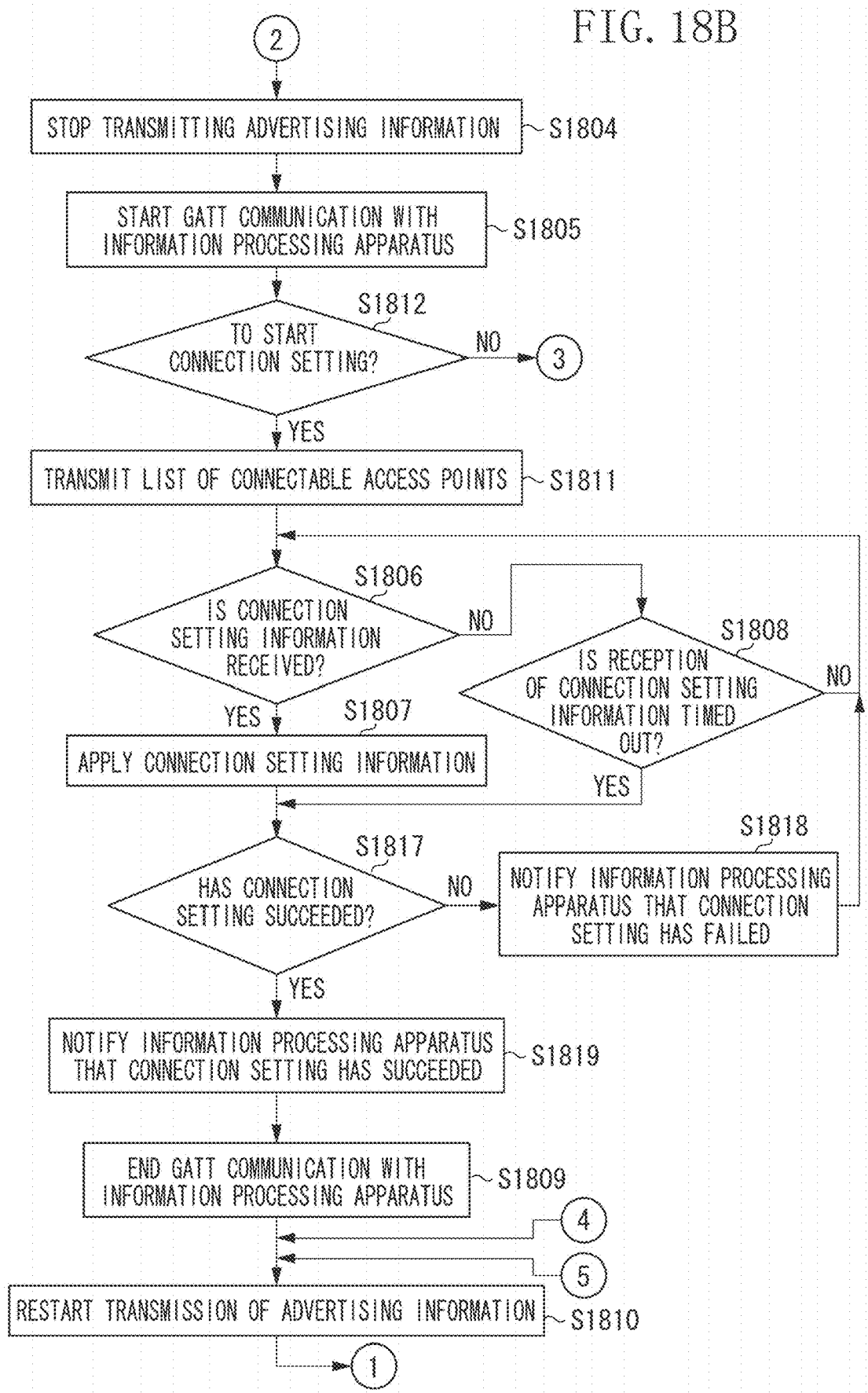
FIG. 18 (including FIGS. 18A, 18B, and 18C) is a flowchart illustrating processing performed by a communication apparatus according to the sixth exemplary embodiment.

Next, processing performed by the communication apparatus 151, which is targeted for the connection setting processing illustrated in FIG. 17, will be described with reference to FIG. 18. FIG. 18 is a flowchart illustrating a flow of the processing performed by the communication apparatus 151 when the communication apparatus 151 is subjected to the connection setting processing from the information processing apparatus 101. For example, the CPU 154 reads out the program stored in the ROM 152, the external storage device (not illustrated) provided in the communication apparatus 151, or the like into the RAM 153, and executes the read program, by which the flowchart illustrated in FIG. 18 is realized. Further, assume that the processing illustrated in the flowchart of FIG. 18 is started when the communication apparatus 151 shifts to the connection setting mode with the pairing being completed between the information processing apparatus 101 and the communication apparatus 151. Processes in steps S1801 to S1816 are similar to the processes in steps S1501 to S1516, respectively, and therefore descriptions thereof will be omitted here.

In step S1817, the CPU 154 determines whether the application of the command for setting the infrastructure connection mode that is contained in the received connection setting information in step S1807 has succeeded. More specifically, the CPU 154 determines whether the connection to the access point indicated by the SSID stored in the connection setting information has succeeded.

If the CPU 154 determines that the connection to the access point has failed (NO in step S1817), the processing proceeds to step S1818. In step S1818, the CPU 154 transmits a notification indicating that the connection setting of the communication apparatus 151 has failed (that the connection between the communication apparatus 151 and the access point has failed), to the information processing apparatus 101 by the GATT communication. The connection to the access point has failed, for example, when the password stored in the connection setting information is incorrect. After that, the CPU 154 performs the processes in step S1806 and the steps subsequent thereto again, and waits for receiving the connection setting information again.

On the other hand, if the CPU 154 determines that the connection to the access point has succeeded (YES in step S1817), the processing proceeds to step S1819. In step S1819, the CPU 154 transmits a notification indicating that the connection setting of the communication apparatus 151 has succeeded (that the connection between the communication apparatus 151 and the access point has succeeded), to the information processing apparatus 101 by the GATT communication. After that, the CPU 154 performs the processes in step S1809 and the steps subsequent thereto. The CPU 154 may be configured to omit the processes in step S1809 and the steps subsequent thereto, and maintain the Bluetooth® Low Energy connection with the information processing apparatus 101.

In this manner, in the present exemplary embodiment, the information processing apparatus 101 can recognize whether the application of the connection setting information has succeeded by exchanging the notification indicating whether the application of the connection setting information has succeeded, by the GATT communication. Then, from this recognition, the information processing apparatus 101 can retry the connection setting processing if the application of the connection setting information has failed.

A seventh exemplary embodiment will be described as a configuration that allows the user to select the communication apparatus to be targeted for the connection setting processing (a target apparatus).

Figure 19C:
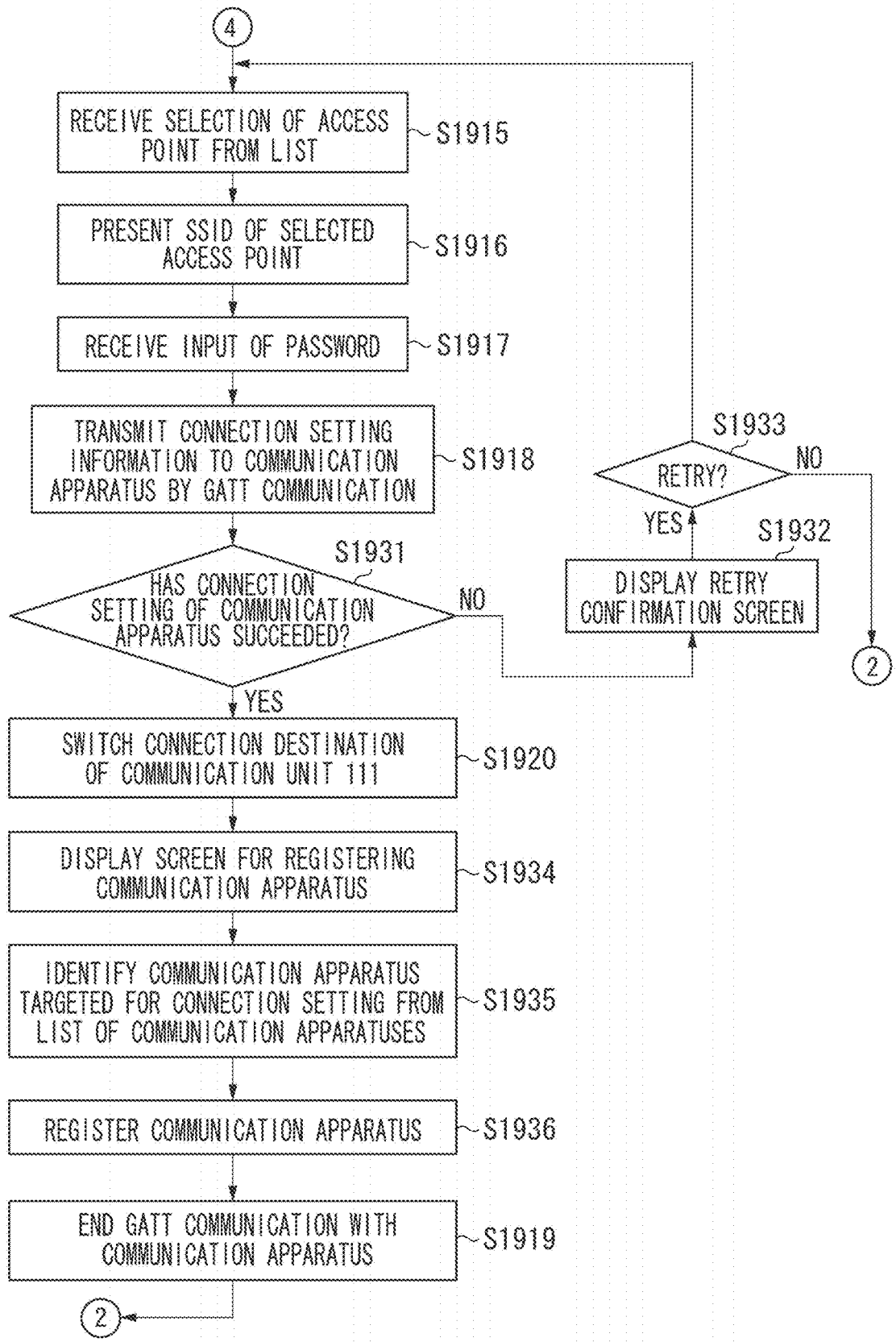
FIG. 19 (including FIGS. 19A, 19B, and 19C) is a flowchart illustrating processing performed by an information processing apparatus according to a seventh exemplary embodiment.

FIG. 19 is a flowchart illustrating a flow of connection setting processing performed by the information processing apparatus 101 according to the present exemplary embodiment. For example, the CPU 103 reads out the program stored in the ROM 104, the external storage device 106, or the like into the RAM 105, and executes the read program, by which the flowchart illustrated in FIG. 19 is realized. Further, assume that the processing illustrated in the flowchart of FIG. 19 is started when the printer setup button 403 is pressed with the pairing completed between the information processing apparatus 101 and the communication apparatus 151. Further, assume that the communication apparatus 151 has shifted to the connection setting mode at this time. Processes in steps S1901 to S1936 are similar to the processes in steps S1701 to S1736, respectively, and therefore descriptions thereof will be omitted here.

In step S1937, the CPU 103 discovers candidates for the communication apparatus to be targeted for the connection setting processing, and displays a list of discovered apparatuses on the display unit 108. More specifically, the CPU 103 first adds the communication apparatus 151 with which the Bluetooth® Low Energy connection has been established in step S1905 to the list. Further, the CPU 103 adds a communication apparatus set in the connection setting mode, which is discovered by a known discovery process, to the list. For example, some communication apparatus can be subjected to connection setting processing via Wi-Fi® instead of the connection setting processing via Bluetooth® Low Energy. If such a communication apparatus is set in the connection setting mode, for example, an internal access point, which is active only when the communication apparatus is in the connection setting mode, is enabled. Therefore, the CPU 103 can discover the communication apparatus set in the connection setting mode by detecting a beacon transmitted from this internal access point in compliance with the Wi-Fi® standard. Further, this internal access point has, for example, a fixed SSID not arbitrarily changeable by the user. Therefore, the CPU 103 identifies the beacon having the fixed SSID among detected beacons, and adds the communication apparatus including the internal access point that has issued the identified beacon to the list. In other words, in the present exemplary embodiment, the communication apparatus 151 to which the information processing apparatus 101 is connected by Bluetooth® Low Energy, and the communication apparatus set in the connection setting mode and including the enabled specific internal access point are displayed in parallel in the list as the communication apparatus to be targeted for the connection setting processing. The communication apparatuses added to the list are not limited to this configuration. For example, a communication apparatus set in the connection setting mode and transmitting specific advertisement information may be added to the list. Further, the timing at which the process in step S1937 is performed is not limited to this configuration. For example, the process in step S1937 may be performed immediately after step S1902. In this case, the communication apparatus 151 that has transmitted the advertisement information received in step S1902 is added to the list. Further, for example, if only a single communication apparatus is added to the list as a result of continuing the discovery of communication apparatuses for a predetermined time period, the processing may proceed to step S1938 without the CPU 103 displaying the list, and the CPU 103 may specify this single communication apparatus as the target apparatus. Further, for example, the CPU 103 may display an error screen on the display unit 108 and end the connection setting processing, if no communication apparatus is added to the list after the discovery processing for the communication apparatus for a predetermined time period. Further, information contained in the list displayed on the display unit 108 may be any information as long as the list contains information corresponding to the communication apparatus added to the list. The information corresponding to the communication apparatus may be, for example, the MAC address or an Internet Protocol (IP) address of the communication apparatus, or may be the SSID of the internal access point provided to the communication apparatus.

In step S1938, the CPU 103 specifies the connection apparatus to be targeted for the connection setting processing (the target apparatus) among the communication apparatuses added to the list by receiving a user's selection. For example, if only a single communication apparatus is added to the list as the result of continuing the discovery of communication apparatuses for the predetermined time period, the CPU 103 may automatically select this single communication apparatus without receiving the user's selection. When the target apparatus is specified, the CPU 103 performs the connection setting processing after that on the specified target apparatus.

This configuration allows the user to select the apparatus to be targeted for the connection setting processing, for example, when there is a plurality of candidates for the apparatus to be targeted for the connection setting processing around the information processing apparatus 101.

As described above, the timing of displaying the list of the candidates for the communication apparatus to be targeted for the connection setting processing, and the timing of discovering the candidates for the communication apparatus to be targeted for the connection setting processing are not limited to the above-described configuration. Other configurations will be described in detail.

For example, the CPU 103 may display the list of the candidates for the communication apparatus to be targeted for the connection setting processing and/or may discover the candidates for the communication apparatus to be targeted for the connection setting processing before starting the GATT communication with the communication apparatus 151. In this case, the communication apparatus set in the connection setting mode, which is searched for by the known discovery process, and the communication apparatus operating as the transmission source of the advertisement information received by the information processing apparatus 101 are displayed in the list in parallel with each other.

At this time, the CPU 103 does not have to display all of communication apparatuses each operating as the transmission source of the advertisement information received by the information processing apparatus 101.

For example, the advertisement information may store therein information regarding a service that the communication apparatus operating as the transmission source of this advertisement information can provide, and/or information regarding a model and/or a vender of this communication apparatus. In this case, for example, if the received advertisement information contains information indicating that the communication apparatus can provide the print service, the CPU 103 displays the communication apparatus operating as the transmission source of this advertisement information in the list. If the received advertisement information does not contain this information, the CPU 103 does not display the communication apparatus operating as the transmission source of this advertisement information in the list. Further or alternatively, for example, if the received advertisement information contains information regarding a model and/or a vender corresponding to the application for printing, the CPU 103 displays the communication apparatus operating as the transmission source of this advertisement information in the list. If the received advertisement information does not contain this information, the CPU 103 does not display the communication apparatus operating as the transmission source of this advertisement information in the list.

Further or alternatively, for example, the advertisement information may store therein information regarding a state of the communication apparatus operating as the transmission source of this advertisement information. In this case, for example, if the received advertisement information does not contain information indicating that the communication apparatus is in a busy state or an error state, the CPU 103 displays the communication apparatus operating as the transmission source of this advertisement information in the list. If the received advertisement information contains this information, the CPU 103 does not display the communication apparatus operating as the transmission source of this advertisement information in the list. This is because, if the communication apparatus is in the busy state or in the error state, the communication apparatus cannot perform the connection setting processing. The busy state refers to, for example, a state in which the communication apparatus is performing the printing or scanning processing, and a state in which an operation is being performed on an operation unit included in the communication apparatus.

Further or alternatively, for example, if the communication apparatus operating as the transmission source of the received advertisement information is the already paired communication apparatus, the CPU 103 displays the communication apparatus operating as the transmission source of this advertisement information in the list. If the communication apparatus operating as the transmission source of the received advertisement information is not the already paired communication apparatus, the CPU 103 does not display the communication apparatus operating as the transmission source of this advertisement information in the list.

Further, for example, the communication apparatus set in the connection setting mode, which is searched for by the known discovery process, may transmit the advertisement information by Bluetooth® Low Energy. Therefore, in the configuration that adds the communication apparatus operating as the transmission source of the advertisement information to the list after adding the communication apparatus set in the connection setting mode to the list, the same communication apparatus may be redundantly displayed in the list. Therefore, the CPU 103 may perform control so as to prevent the same communication apparatus from being redundantly displayed in the list. For example, the advertisement information may store therein the identification information of the communication apparatus operating as the transmission source of this advertisement information. Further, if discovering the communication apparatus by the known discovery process, the CPU 103 can acquire the identification information of the discovered communication apparatus. Therefore, the CPU 103 performs control so as to prevent the same communication apparatus from being redundantly displayed, if the identification information of the communication apparatus operating as the transmission source of this advertisement information, and the identification information of the communication apparatus discovered by the known discovery process match each other.

Further, the CPU 103 may perform the connection setting processing via Wi-Fi® instead of the connection setting processing via Bluetooth® Low Energy, if the communication apparatus in which the specific internal access point is enabled is selected from the communication apparatuses displayed in the list. In this case, the CPU 103 transmits the connection information for connecting to the specific internal access point to the selected communication apparatus.

This connection information contains, for example, the SSID of the specific internal access point and a password for connecting to the specific internal access point. The CPU 103 may acquire the password for connecting to the specific internal access point by receiving an input from the user, or may acquire this password without receiving the input from the user by acquiring it from the application for printing.

Upon the transmission of the connection information, the information processing apparatus 101 and the selected communication apparatus are connected to each other via the specific internal access point by the Wi-Fi® communication method. Then, the CPU 103 transmits the connection setting information for registering the access point 131 as the connection destination of the selected communication apparatus to the selected communication apparatus by the Wi-Fi® communication. As a result, the infrastructure connection mode is set to the selected communication apparatus.

In this manner, the CPU 103 may switch whether to perform the connection setting processing via Bluetooth® Low Energy or perform the connection setting processing via Wi-Fi® according to which communication apparatus is selected by the user via the list. In other words, if the selected communication apparatus is the communication apparatus operating as the transmission source of the advertisement information received by the information processing apparatus 101 or the communication apparatus to which the information processing apparatus 101 is connected by Bluetooth® Low Energy, the CPU 103 performs the connection setting processing by Bluetooth® Low Energy. On the other hand, if the selected communication apparatus is the communication apparatus in which the specific internal access point is enabled, the CPU 103 performs the connection setting processing by Wi-Fi®.

Other Exemplary Embodiments

In the above-described exemplary embodiments, the communication apparatus 151 targeted for the connection setting processing is registered as the communication destination of the information processing apparatus 101, but the registration of the communication apparatus 151 is not limited to this configuration. For example, if detecting that the communication apparatus 151 targeted for the connection setting processing is already registered with the information processing apparatus 101 as the communication destination based on the acquired identification information of the communication apparatus 151 or the like, the information processing apparatus 101 may stop the connection setting processing, and present a display indicating this fact on the display unit 108 of the information processing apparatus 101.

In the above-described exemplary embodiments, the communication system is configured in such a manner that the information processing apparatus 101 connects to the access point in the communication apparatus 151 in the direct connection, but the direct connection is not limited thereto. For example, the communication system may be configured in such a manner that the communication apparatus 151 connects to an access point in the information processing apparatus 101. In this case, the information processing apparatus 101 transmits connection setting information storing therein an SSID and a password of the access point in the information processing apparatus 101 to the communication apparatus 151. Then, the communication apparatus 151 connects to the access point in the information processing apparatus 101 with use of the SSID and the password of the access point in the information processing apparatus 101 that are contained in the received connection setting information by the wireless LAN communication method.

The above-described exemplary embodiments include the configuration that ends the GATT communication after the connection setting processing is completed, but handling the GATT communication is not limited to this configuration. More specifically, the communication system may be configured to maintain the state capable of carrying out the GATT communication and allow information to be acquired when necessary by the GATT communication even after the connection setting processing is completed. In this case, for example, the communication system may be configured in such a manner that the information processing apparatus 101 and the communication apparatus 151 exchange the notification indicating whether the connection setting has succeeded by the GATT communication, and, for example, perform processing according to a result thereof (the processing for retrying the connection setting), as described in the description of the sixth exemplary embodiment.

The above-described exemplary embodiments include the configuration that switches the connection destination of the communication unit 111 if the connection setting processing is performed for connecting the communication apparatus 151 to an access point other than the access point 131 to which the information processing apparatus 101 is connected. However, switching the connection destination is not limited to this configuration. More specifically, the information processing apparatus 101 may be configured in such a manner that the information processing apparatus 101 does not automatically switch the connection destination of the communication unit 111 but the user manually switches the connection destination of the communication unit 111 as appropriate, thereby making the communication apparatus 151 and the information processing apparatus 101 communicable with each other. However, in this case, for example, the communication apparatus 151 targeted for the connection setting may be missing in the list of registerable communication apparatuses immediately after the connection setting processing. Therefore, a result of the processing for identifying the communication apparatus 151 targeted for the connection setting from the list of registerable communication apparatuses may end up an error. In this case, the user first manually switches the connection destination of the communication unit 111, and connects the information processing apparatus 101 to the access point to which the communication apparatus 151 is connected. This switching causes an update of the list of registerable communication apparatuses, whereby the user can make the communication apparatus 151 and the information processing apparatus 101 communicable with each other by selecting the communication apparatus 151 targeted for the connection setting from the updated list.

In the above-described exemplary embodiments, the instruction to perform the connection setting processing is assumed to be issued from the user without the Bluetooth® Low Energy connection established between the communication apparatus 151 and the information processing apparatus 101. However, the issue of this instruction is not limited to this configuration. For example, the instruction to perform the connection setting processing may be issued from the user with the Bluetooth® Low Energy connection established in advance between the communication apparatus 151 and the information processing apparatus 101. In this case, the processes for establishing the Bluetooth® Low Energy connection (steps S202, S204, S205, S302, S304, S305, and the like) are omitted.

In the above-described exemplary embodiments, the connection setting processing is assumed to be started when the printer setup button 403 is pressed by the user. However, the start of the connection setting processing is not limited to this configuration. For example, the communication system may be configured in such a manner that the connection setting processing is automatically started after the pairing is conducted. In this case, the Bluetooth® Low Energy connection is established by the pairing between the communication apparatus 151 and the information processing apparatus 101, so that the processes for establishing the Bluetooth® Low Energy connection (steps S202, S204, S205, S302, S304, S305, and the like) are omitted. Further, for example, in a case where this configuration is applied to the seventh exemplary embodiment, the processes in steps S1937 and S1938 (selection processing) may be omitted in the connection setting processing automatically started after the pairing is conducted. In other words, the communication system may be configured in such a manner that the selection processing is omitted in the connection setting processing automatically started after the pairing is conducted, while the selection processing is performed in the connection setting processing started when the printer setup button 403 is pressed by the user. This is because the communication apparatus connected by the pairing is highly likely the apparatus to be targeted for the connection setting processing automatically started after the pairing is conducted, so that the target apparatus can be determined even without receiving the user's selection.

Embodiments can also be realized by processing that supplies a program capable of achieving one or more function(s) of the above-described exemplary embodiments to a system or an apparatus via a network or a storage medium, and causes one or more processor(s) in a computer of this system or apparatus to read out and execute the program. Embodiments can also be realized with use of a circuit (for example, an application specific integrated circuit (ASIC)) capable of achieving one or more function(s).

According to the embodiments, the infrastructure connection can be further easily and simply established.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A control method for an information processing apparatus capable of connecting to an external access point which is located outside the information processing apparatus, comprising:

receiving a list of a plurality of external access points from a communication apparatus which is located outside the information processing apparatus and outside the external access point;

displaying a service set identifier (SSID) of the external access point to which the information processing apparatus is currently wirelessly connected based on the external access point to which the information processing apparatus is currently wirelessly connected being included in the list, and displaying the list based on the external access point to which the information processing apparatus is currently wirelessly connected being not included in the list; and in a case where the SSID is displayed, transmitting first connection information, which includes the SSID and which is used for getting connected to the external access point to which the information processing apparatus is currently wirelessly connected, to the communication apparatus by using a predetermined wireless communication scheme in a state in which the information processing apparatus remains wirelessly connected to the external access point, and in a case where the list is displayed, transmitting second connection information, which is used for getting connected to the external access point selected from the list by a user, to the communication apparatus by using the predetermined wireless communication scheme.

2. The control method according to claim 1, wherein the first connection information includes a password.

3. The control method according to claim 1, wherein the SSID is displayed by a predetermined application program of the information processing apparatus, and
wherein the SSID that is displayed is acquired from an operating system (OS) of the information processing apparatus.

4. The control method according to claim 1, further comprising:
in a case where a connection between the external access point to which the information processing apparatus is currently wirelessly connected and the communication apparatus is established successfully by using the transmitted first connection information, displaying a screen that is based on the success of establishing the connection between the external access point to which the information processing apparatus is currently wirelessly connected and the communication apparatus by using the transmitted first connection information.

5. The control method according to claim 1, further comprising:
in a case where an attempt to establish a connection between the external access point to which the information processing apparatus is currently wirelessly connected and the communication apparatus by using the transmitted first connection information fails, displaying a screen that is based on the failure of establishing the connection between the external access point to which the information processing apparatus is currently wirelessly connected and the communication apparatus by using the transmitted first connection information.

6. The control method according to claim 1, further comprising:
acquiring information that indicates whether an attempt to establish a connection between the external access point to which the information processing apparatus is currently wirelessly connected and the communication apparatus by using the transmitted first connection information is successful or not in a state in which the information processing apparatus remains wirelessly connected to the external access point.

7. The control method according to claim 1, wherein the connection between the information processing apparatus and the external access point is Wi-Fi connection.

8. The control method according to claim 1, wherein the SSID is displayed based on detecting by the information processing apparatus predetermined information outputted by the communication apparatus.

9. The control method according to claim 8, further comprising:
in a case where a predetermined time elapses without receiving by the information processing apparatus the predetermined information, displaying a screen that is based on the elapsing of the predetermined time without receiving the predetermined information by the information processing apparatus.

10. The control method according to claim 8, wherein the predetermined information is information that includes identification information for identifying the communication apparatus.

11. The control method according to claim 1, further comprising:
registering the communication apparatus as a communication destination of the information processing apparatus after the connection information is transmitted to the communication apparatus.

12. The control method according to claim 11, further comprising:
detecting the communication apparatus by communication with the communication apparatus via the external access point to which the information processing apparatus is currently wirelessly connected;
wherein, based on detecting the communication apparatus, the communication apparatus is registered as the communication destination of the information processing apparatus.

13. The control method according to claim 1, wherein the communication apparatus is a printer.

14. The control method according to claim 1, wherein the predetermined wireless communication scheme is Bluetooth.

15. The control method according to claim 1, wherein the predetermined wireless communication scheme is Bluetooth Low Energy.

16. The control method according to claim 1, further comprising, in a case where the external access point to which the information processing apparatus is wirelessly connected is not included in the list, switching a connection destination of the information processing apparatus to the external access point selected from the list by the user.

17. The control method according to claim 16, wherein the connection destination of the information processing apparatus is switched to the external access point selected from the list by the user after the second connection information has been transmitted to the communication apparatus by using the predetermined communication scheme.

18. The control method according to claim 17, wherein the list is a list of a plurality of external access points to which the communication apparatus is capable of connecting.

19. A non-transitory computer-readable storage medium storing a program for causing an information processing apparatus capable of connecting to an external access point which is located outside the information processing apparatus to execute a control method, the control method comprising:
receiving a list of a plurality of external access points from a communication apparatus which is located outside the information processing apparatus and outside the external access point;
displaying a service set identifier (SSID) of the external access point to which the information processing apparatus is currently wirelessly connected based on the external access point to which the information processing apparatus is currently wirelessly connected being included in the list, and displaying the list based on the external access point to which the information processing apparatus is currently wirelessly connected being not included in the list; and
in a case where the SSID is displayed, transmitting first connection information, which includes the SSID and which is used for getting connected to the external access point to which the information processing apparatus is currently wirelessly connected, to the communication apparatus by using a predetermined wireless communication scheme in a state in which the information processing apparatus remains wirelessly connected to the external access point, and in a case where the list is displayed, transmitting second connection information, which is used for getting connected to the external access point selected from the list by a user, to the communication apparatus by using the predetermined wireless communication scheme.

20. An information processing apparatus capable of connecting to an external access point which is located outside the information processing apparatus, comprising:
a receiving unit configured to receive a list of a plurality of external access points from a communication apparatus which is located outside the information processing apparatus and outside the external access point;
a display unit configured to display a service set identifier (SSID) of the external access point to which the information processing apparatus is currently wirelessly connected based on the external access point to which the information processing apparatus is currently wirelessly connected being included in the list, and displaying the list based on the external access point to which the information processing apparatus is currently wirelessly connected being not included in the list; and in a case where the SSID is displayed, transmitting first connection information transmitting first connection information, which includes the SSID and which is used for getting connected to the external access point to which the information processing apparatus is currently wirelessly connected, to the communication apparatus by using a predetermined wireless communication scheme in a state in which the information processing apparatus remains wirelessly connected to the external access point, and in a case where the list is displayed, transmitting second connection information, which is used for getting connected to the external access point selected from the list by a user, to the communication apparatus by using the predetermined wireless communication scheme.

* * * * *